US012560506B2

(12) United States Patent
Niimi et al.

(10) Patent No.: US 12,560,506 B2
(45) Date of Patent: Feb. 24, 2026

(54) INSPECTION DEVICE AND NON-TRANSITORY COMPUTER READABLE MEDIUM

(71) Applicant: DENSO CORPORATION, Kariya (JP)

(72) Inventors: Naohisa Niimi, Kariya (JP); Gentaro Masuda, Kariya (JP); Hiroshi Tanioku, Kariya (JP); Yoshihiko Shiraishi, Kariya (JP); Naoki Hasegawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 433 days.

(21) Appl. No.: 18/188,576

(22) Filed: Mar. 23, 2023

(65) Prior Publication Data

US 2023/0228646 A1      Jul. 20, 2023

Related U.S. Application Data

(63) Continuation of application No. PCT/JP2021/031150, filed on Aug. 25, 2021.

(30) Foreign Application Priority Data

Sep. 25, 2020      (JP) ................................. 2020-161288

(51) Int. Cl.
*G01M 3/28*          (2006.01)
*A01G 25/16*          (2006.01)
(52) U.S. Cl.
CPC ......... *G01M 3/2815* (2013.01); *A01G 25/165* (2013.01)

(58) Field of Classification Search
CPC . G01M 3/2815; A01G 25/165; A01G 25/167; A01G 25/16; A01G 25/06; A01G 25/02; E03B 7/00
See application file for complete search history.

(56) References Cited

U.S. PATENT DOCUMENTS 10,359,336 B2 * 7/2019 Bagasra ................... B64D 1/18
2015/0361630 A1 * 12/2015 Appelboom ........ H01M 10/465
                                                            405/104

(Continued)

FOREIGN PATENT DOCUMENTS

JP          3444192 B2      9/2003
JP          5830411 B2      12/2013

(Continued)

OTHER PUBLICATIONS

U.S. Appl. No. 18/188,703, filed Mar. 23, 2023, Niimi et al.

*Primary Examiner* — An H Do
(74) *Attorney, Agent, or Firm* — Posz Law Group, PLC

(57) ABSTRACT
An inspection device includes an output unit, a storage unit, and an inspection unit. The output unit outputs a control signal for controlling a water supply valve to control supply and no supply of irrigation water from a water supply pipe in an open farm field, between an open state and a closed state. The storage unit stores water pressures of irrigation water as detected in a period from a state where the water supply valve becomes in the open state and irrigation water is supplied from the water supply pipe until an expected time elapses after the water supply valve becomes in the closed state and the water supply pipe is expected to be filled with irrigation water. The inspection unit calculates a time constant of water pressure based on the water pressures and inspects the water supply pipe based on the time constant.

10 Claims, 18 Drawing Sheets

(56)           References Cited

U.S. PATENT DOCUMENTS

2016/0342392  A1    11/2016  Tasaki
2018/0141069  A1     5/2018  Lemkin
2019/0003916  A1     1/2019  Ando
2021/0114559  A1     4/2021  Okura

FOREIGN PATENT DOCUMENTS

JP        2015-231326  A    12/2015
JP        2017-009305  A     1/2017
JP        2017-023021  A     2/2017
JP          6218075  B2    10/2017
JP        2019-012050  A     1/2019

* cited by examiner

| 341 | 342 |
|-----|-----|
| ADD | DAT |

S

S10 — ACQUIRE SENSOR SIGNAL AND ACQUISITION TIME

S20 — STORE SENSOR SIGNAL AND ACQUISITION TIME

S30 — OUTPUT SENSOR INFORMATION

E

S

S110 — READ INFORMATION IN INFORMATION STORAGE UNIT

S120 — UPDATE IRRIGATION SCHEDULE AND SENSOR PROCESSING

E

INSPECTION DEVICE AND NON-TRANSITORY COMPUTER READABLE MEDIUM

CROSS REFERENCE TO RELATED APPLICATION

The present application is a continuation application of International Patent Application No. PCT/JP2021/031150 filed on Aug. 25, 2021, which designated the U.S. and claims the benefit of priority from Japanese Patent Application No. 2020-161288 filed on Sep. 25, 2020. The entire disclosures of all of the above applications are incorporated herein by reference.

TECHNICAL FIELD

The present disclosure relates to an inspection device and a non-transitory computer readable medium.

BACKGROUND

A water leak cause monitoring device has been used for detecting a water pressure of a pipe.

SUMMARY

According to an aspect of the present disclosure, an inspection device is configured to inspect a water supply pipe provided in an open farm field in which a plant grows.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
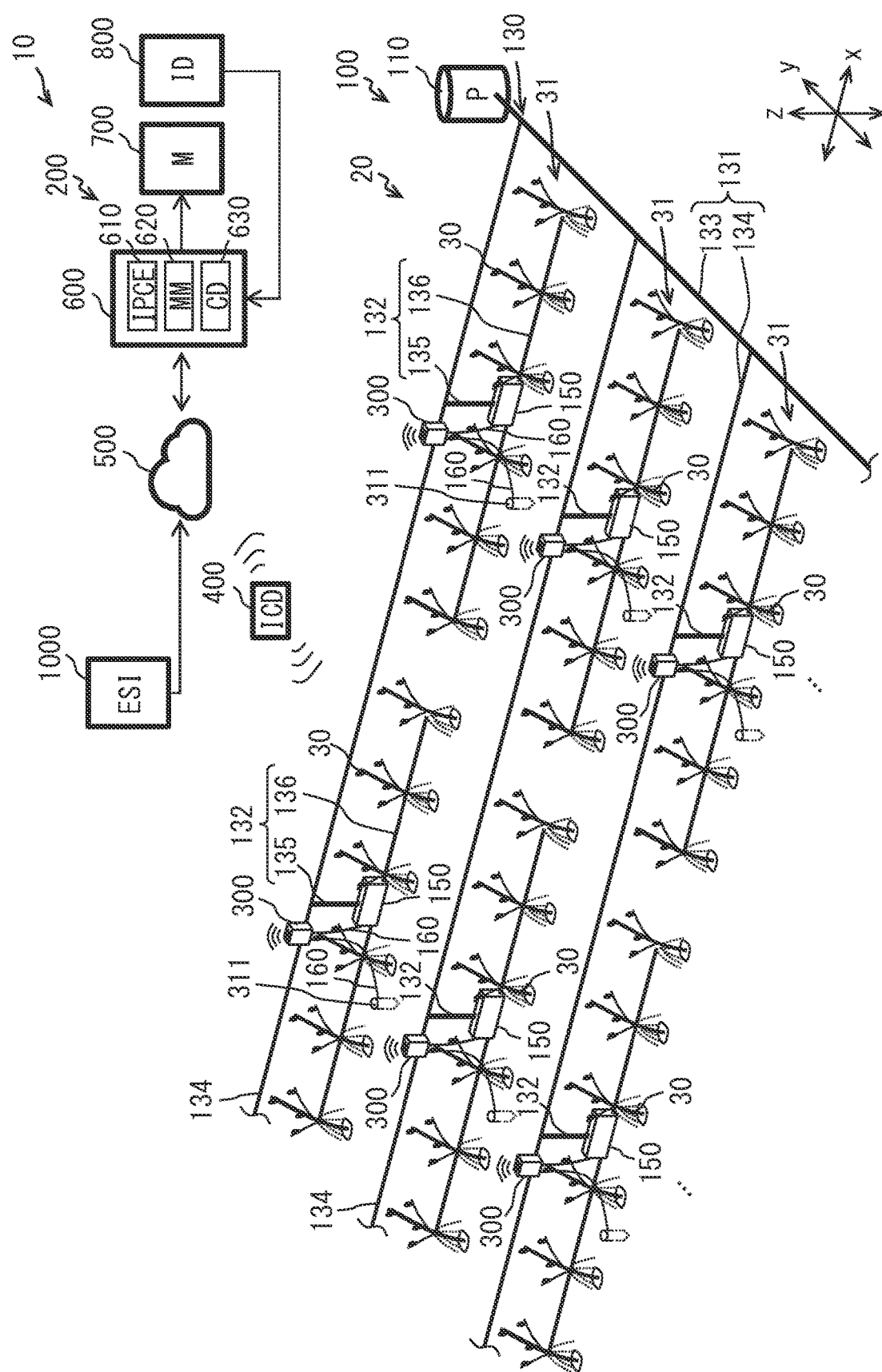
FIG. 1 is a perspective view schematically illustrating an irrigation system provided to a farm field.

Hereinafter, examples of the present disclosure will be described.

According to an example of the present disclosure, a water leak cause monitoring device includes a water pressure sensor that detects a water pressure of a pipe.

The water leak cause monitoring device detects a water leak based on a decrease in hydrostatic pressure of a pipe in a time zone during which a hydrant is not operated by a farmer. In such a method, the time zone of the agricultural work and the time zone of the water leak detection are separated from each other to be, for example, in daytime and nighttime. Therefore, there is an issue in that the work becomes cumbersome.

According to an examples of the present disclosure, an inspection device is configured to inspect a water supply pipe provided in an open farm field in which a plant grows. The inspection device comprises:

an output unit configured to output a control signal to control a water supply valve, which is configured to control supply and no supply of irrigation water from the water supply pipe to the farm field, between an open state and a closed state;

a storage unit configured to store a plurality of water pressures of irrigation water detected by a water pressure sensor in a period from a state where the water supply valve becomes in the open state and where irrigation water is supplied from the water supply pipe to the farm field until an expected time elapses after the water supply valve becomes in the closed state and the water supply pipe is expected to be filled with irrigation water; and an inspection unit configured to calculate a time constant of a water pressure based on a change in the plurality of water pressures of the irrigation water and inspect the water supply pipe based on the time constant.

An inspection program according to an aspect of the present disclosure is to be executed by a processor to cause the processor to cause a water supply valve, which is provided to a water supply pipe provided in an open farm field in which a plant grows, to transit from a state where the water supply valve is in an open state and where irrigation water is supplied from the water supply pipe to the farm field, to a state where the water supply valve is in a closed state and where supply of irrigation water from the water supply pipe to the farm field is stopped, acquire a plurality of water pressures of irrigation water detected by a water pressure sensor in a period from a state where the water supply valve becomes in the open state, until an expected time elapses after the water supply valve becomes in the closed state and the water supply pipe is expected to be filled with irrigation water, and calculate a time constant of a water pressure based on a change in the plurality of water pressures of the irrigation water and inspect the water supply pipe based on the time constant.

As described above, the time zone in which irrigation water is supplied from the water supply pipe to the farm field and the time zone in which the water supply pipe is inspected are continuous. Therefore, the operation is less likely to be cumbersome.

Even if the damage in the water supply pipe 130 is so minor that no change in water pressure occurs in a state where the water supply pipe is filled with irrigation water for example, the time constant is expected to be somewhat delayed. Therefore, by inspecting the water supply pipe based on the time constant, whether even minor damage has occurred in the water supply pipe can be detected.

Hereinafter, a plurality of embodiments of the present disclosure will be described with reference to the drawings. In each embodiment, the same reference numerals are given to portions corresponding to the matters described in the preceding embodiments, and redundant description may be omitted. In a case where only a part of the configuration is described in each embodiment, other embodiments previously described are applicable to the remaining part of the configuration.

Parts of embodiment that are clearly described to be specifically combinable can be combined with each other. Partial combination between embodiments, between an embodiment and a modification, and between modifications is possible even if they are not clearly described to be combinable, as long as the combination leads to no problem.

First Embodiment

An irrigation system according to the present embodiment will be described based on FIGS. 1 to 15.

Hereinafter, three directions orthogonal to each other are referred to as an x direction, a y direction, and a z direction. In the present embodiment, a plane defined by the x direction and the y direction is along the horizontal plane. The z direction is along the vertical direction. In the drawings, the word "direction" is omitted, and x, y, and z are simply described.

<Farm Field>

An irrigation system 10 is applied to an open farm field 20 cultivated in hills and plains. To simplify the following description, as illustrated in FIG. 1, an embodiment in which the irrigation system 10 is applied to the farm field 20 cultivated in a plain will be described. The size of the farm field 20 is several tens of square meters to several thousands of square kilometers.

The farm field 20 is provided with a plurality of growth sites such as ridges extending in the x direction. These plurality of growth sites extending in the x direction are arranged apart from each other in the y direction. The seeds and seedlings of plants 30 are planted in each of the plurality of growth sites. Examples of the plants 30 include grape, corn, almond, raspberry, leaf vegetables, cotton, and the like.

A plurality of the plants 30 grow in one growth site. As illustrated in FIG. 1, the plurality of plants 30 are arranged in the x direction to form a column. Hereinafter, the plurality of plants 30 arranged in a column in the x direction is referred to as a plant group 31. In the farm field 20, a plurality of the plant groups 31 are arranged apart from each other in the y direction.

The minimum separation distance between of the plurality of plant groups 31 in the y direction is longer than the minimum separation distance between the plurality of plants 30 included in one plant group 31 in the x direction. The separation interval of the plurality of plant groups 31 in the y direction is variously changed according to the type of the plants 30 grown as well as the undulations and climate of the farm field 20.

The separation interval of the plurality of plant groups 31 in the y direction is about 1 m to 10 m. This guarantees a space sufficient for at least a person to move in the x direction between two plant groups 31 even if branches and leaves of the plants 30 vigorously grow in the y direction.

<Irrigation System>

The irrigation system 10 includes a water supply device 100 and a control device 200. The water supply device 100 supplies irrigation water to the plants 30 in the farm field 20. The control device 200 determines the supply time and amount of the irrigation water from the water supply device 100 to the plants 30 during an irrigation period. The control device 200 determines an irrigation schedule for the water supply device 100.

<Water Supply Device>

The water supply device 100 includes a pump 110, a water supply pipe 130, and a piping module 150. The pump 110 supplies the irrigation water to the water supply pipe 130. The piping module 150 controls discharge of the irrigation water supplied to the water supply pipe 130.

<Pump>

The pump 110 is in a constantly driven state. Alternatively, the pump 110 is in a daytime driving state. The pump 110 pumps out the irrigation water stored in a tank or a reservoir and supplies the irrigation water to the water supply pipe 130. Examples of the irrigation water include well water, river water, rainwater, city water, and the like.

As described below, the water supply pipe 130 is provided with a plurality of water supply valves 152. When each of the plurality of water supply valves 152 is in a closed state and the irrigation water is not leaking from the water supply pipe 130, the water supply pipe 130 is filled with the irrigation water. In this state, the water pressure in the water supply pipe 130 is of a value (pump pressure) depending on the discharge capacity of the pump 110.

When the water supply valve 152 transitions to an open state from the closed state, the irrigation water is discharged from the water supply pipe 130 to the farm field 20. Once the discharge amount of the irrigation water is stabilized on a time-average basis, the water pressure in the water supply pipe 130 is flow pressure lower than the pump pressure.

<Water Supply Pipe>

Water supply pipe 130 includes a main pipe 131 and drip pipe 132. The main pipe 131 is connected to the pump 110. The drip pipe 132 is connected to the main pipe 131. The pump 110 supplies the irrigation water from the main pipe 131 to the drip pipe 132. This irrigation water is supplied from the drip pipe 132 to the farm field 20.

<Main Pipe>

The main pipe 131 includes a longitudinal pipe 133 and a lateral pipe 134. The longitudinal pipe 133 extends in the y direction. The lateral pipe 134 extends in the x direction. The longitudinal pipe 133 and the lateral pipe 134 are connected to each other. With such a configuration, the irrigation water flows in the y direction and the x direction in the main pipe 131.

In the example illustrated in FIG. 1, one longitudinal pipe 133 is connected to one pump 110. A plurality of the lateral pipes 134 extend in the x direction from the longitudinal pipe 133 extending in they direction. The position of the lateral pipe 134 in the z direction is set to be more separated from the ground than the apices of the plants 30 fully grown are.

Needless to say, the configuration illustrated in FIG. 1 is merely an example. The number of pumps 110 and longitudinal pipes 133 provided in the farm field 20, the number of longitudinal pipes 133 connected to one pump 110, the number of longitudinal pipes 133 connected to one lateral pipe 134, and the positions of the lateral pipes 134 and the longitudinal pipes 133 in the z direction are not particularly limited.

The plurality of lateral pipes 134 are arranged apart from each other in the y direction. The minimum separation distance between the plurality of lateral pipes 134 in the y direction is equivalent to the minimum separation distance between the plurality of plant groups 31 in the y direction. One of the plurality of lateral pipes 134 is provided to one of the plurality of plant groups 31. The lateral pipe 134 extends along a direction (x direction) in which the plurality of plants 30 included in the plant group 31 are arranged. The drip pipe 132 is connected to the lateral pipe 134.

<Drip Pipe>

A plurality of the drip pipes 132 are connected to one lateral pipe 134. The plurality of drip pipes 132 connected to one lateral pipe 134 are arranged apart from each other in the x direction.

Figure 2:
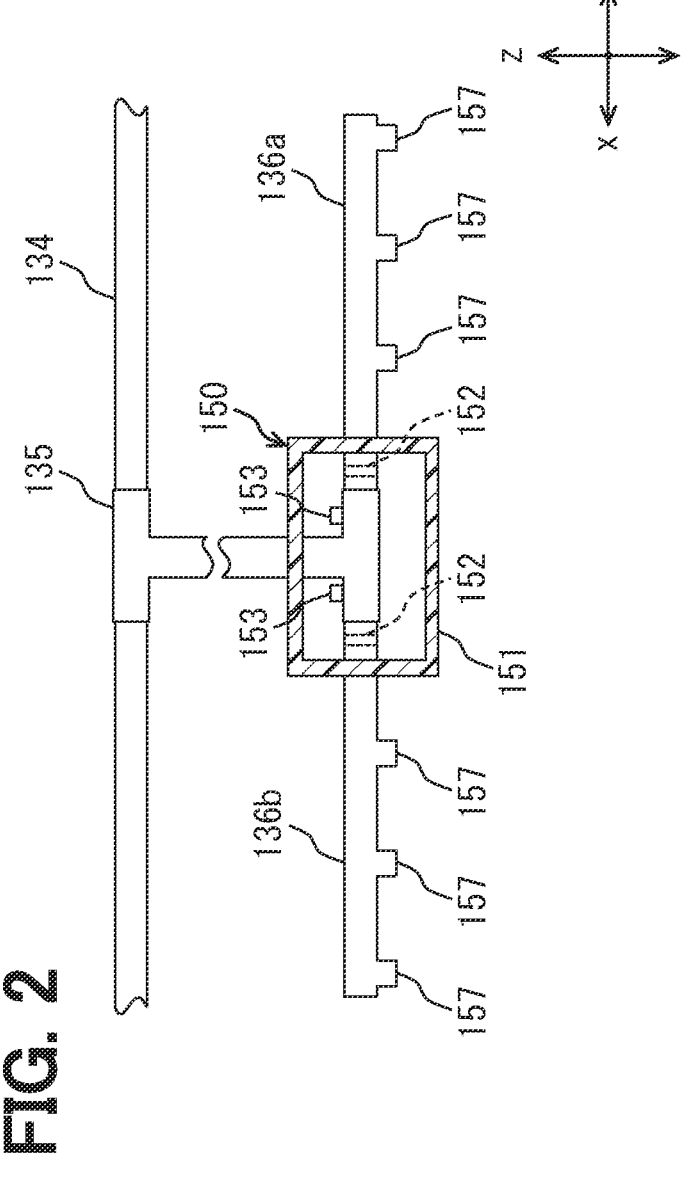
FIG. 2 is a side view illustrating a water supply pipe and a piping module.

As illustrated in FIG. 2, the drip pipe 132 includes an extension pipe 135 and branch pipes 136. The extension pipe 135 extends downward in the z direction from the lateral pipe 134. Two connection ports open in the x direction are formed on the distal end sides of the extension pipe 135. The branch pipes 136 are connected to these two connection ports.

The branch pipes 136 include a first branch pipe 136a connected to one of the two connection ports and a second branch pipe 136b connected to the other of the two connection ports. The first branch pipe 136a and the second branch pipe 136b extend in directions opposite to each other in the x direction from positions connected with the extension pipe 135.

In each of the first branch pipe 136a and the second branch pipe 136b, a drip hole 137 through which an internal space where the irrigation water flows communicates with an external space outside the internal space is formed. The drip hole 137 is opened on the lower surface on the ground side of each of the first branch pipe 136a and the second branch pipe 136b.

The drip hole 137 may be opened on the upper surface on the sky side of each of the first branch pipe 136a and the second branch pipe 136b. The drip hole 137 may be opened on the side surface of each of the first branch pipe 136a and the second branch pipe 136b, connecting the upper surface and the lower surface.

A plurality of the drip holes 137 are formed in each of the first branch pipe 136a and the second branch pipe 136b. The plurality of drip holes 137 are arranged apart from each other in the x direction. The separation interval between the plurality of drip holes 137 in the x direction is equivalent to the separation interval between the plurality of plants 30 in the x direction. Three drip holes 137 are formed in each of the first branch pipe 136a and the second branch pipe 136b in the example illustrated in FIG. 2.

The separation interval between the plurality of drip holes 137 may be different from the separation interval between the plurality of plants 30. The number of drip holes 137 formed in the first branch pipe 136a and the second branch pipe 136b is not limited to three.

<Flow of Irrigation Water>

The irrigation water supplied to the longitudinal pipe 133 by the pump 110 flows in the y direction in the longitudinal pipe 133. This irrigation water is supplied to each of the plurality of lateral pipes 134 connected to the longitudinal pipe 133. The irrigation water flows in the x direction in each of the plurality of lateral pipes 134.

The irrigation water flowing in the lateral pipe 134 flows into the branch pipe 136 through the extension pipe 135. This irrigation water is discharged from the drip holes 137 of each of the first branch pipe 136a and the second branch pipe 136b. Thus, the irrigation water is supplied to the plant 30.

In the example illustrated in FIG. 1, each of the first branch pipe 136a and the second branch pipe 136b is located more on the ground side of the farm field 20 than the apex side of the plant 30 in the z direction. The irrigation water dripping from the drip holes 137 of the first branch pipe 136a and the second branch pipe 136b is mainly supplied to the trunk and the root of the plants 30.

<Water Spray Nozzle>

A configuration may be employed in which a water spray nozzle is attached to the drip holes 137. An injection direction of the irrigation water injected from the water spray nozzle may be directed toward the ground side or the sky side in the z direction. When the irrigation water is injected toward the sky, the injection direction of the irrigation water is more likely to spread in the horizontal direction as compared with the configuration in which the irrigation water is injected toward the ground. Therefore, the irrigation water injected from the water spray nozzle is sprayed over a wide range of the farm field 20.

Whether the irrigation water is injected toward the ground side or the sky side can be determined based on the type of the plant 30 to which the irrigation water is supplied, the depth of the soil layer of the farm field 20, the climate of the farm field 20, and the like. For example, in cases of the plant 30 having roots growing widely, a shallow soil layer, or a climate under which the drying is less likely to occur, the irrigation water is injected toward the sky side. In cases of the plant 30 having roots growing deeply, a deep soil layer, or a climate under which the drying is likely to occur, the irrigation water is injected toward the ground side.

<Piping Module>

As simply illustrated in FIG. 2, the drip pipe 132 is provided with the piping module 150. The piping module 150 includes a storage box 151, the water supply valve 152, and a water pressure sensor 153. The water supply valve 152 and water pressure sensor 153 are stored in the storage box 151. The storage box 151 is illustrated in a cross-sectional view in the drawing.

<Water Supply Valve>

The water supply valve 152 is provided on the side of the position, of each of the first branch pipe 136a and the second branch pipe 136b, connected with the extension pipe 135. All the drip holes 137 are located between the respective distal end sides of the first branch pipe 136a and the second branch pipe 136b, separated from the extension pipe 135, and the water supply valves 152.

When the water supply valves 152 is in the open state, the extension pipe 135 and the drip holes 137 communicate with each other. Thus, the irrigation water is discharged from the drip holes 137. On the other hand, once the water supply valves 152 is in the closed state, the extension pipe 135 and the drip holes 137 are no longer in communication with each other. Thus, the irrigation water is discharged from the drip holes 137.

The water supply valve 152 provided to the first branch pipe 136a and the water supply valve 152 provided to the second branch pipe 136b are controlled by the control device 200 to be opened and closed independently from one another. With this opening/closing control, the discharge of the irrigation water from the drip holes 137 of the first branch pipe 136a and the discharge of the irrigation water from the drip holes 137 of the second branch pipe 136b are controlled independently from each other. As the water supply valve 152, an electromagnetic valve is employed that can be switched between the open state and the closed state in response to a discharge signal input and not input.

<Water Pressure Sensor>

The water pressure sensor 153 is provided on each of the side of the two connection ports of the extension pipe 135 connected to the first branch pipe 136a and the second branch pipe 136b. The two water pressure sensors 153 each detect the water pressure in the extension pipe 135. The water pressure detected by the water pressure sensor 153 is output to the control device 200.

The locations where the water pressure sensors 153 are disposed are not limited to the example described above. For example, the water pressure sensor 153 may be provided at each of a location between the position of the first branch pipe 136a connected to the extension pipe 135 and the position where the water supply valve 152 is located, and a location between the position of the second branch pipe 136b connect to the extension pipe 135 and the position where the water supply valve 152 is located. The water pressure sensor 153 may be provided at a portion of extension of the extension pipe 135 in the z direction. The water pressure sensor 153 may be provided at a portion of the extension pipe 135 connected to the lateral pipe 134. The water pressure sensor 153 may be at any location more on the lateral pipe 134 side than the water supply valve 152, in a flow path of the irrigation water in the drip pipe 132.

When the water supply valves 152 are in the closed state and the extension pipe 135 is filled with the irrigation water, the water pressure sensor 153 detects the pump pressure.

When the water supply valve 152 transitions to the open state from the closed state, the irrigation water is discharged from the branch pipes 136. When the discharge amount of the irrigation water is stabilized on a time-average basis, the water pressure sensor 153 detects the flow pressure.

When the water supply valve 152 transitions to the closed state from the open state, the irrigation water is no longer discharged from the water supply pipe 130. The water pressure in the water supply pipe 130 gradually recovers from the flow pressure to the pump pressure. The water pressure sensor 153 detects a water pressure in a transition period in which the flow pressure gradually recovers to the pump pressure.

When damage has occurred in the water supply pipe 130 or the water supply valve 152 and the irrigation water is leaking from the damaged portion, the water pressure detected by the water pressure sensor 153 drops. Thus, whether there is a damage can be detected. This damage detection processing is executed by the control device 200.

<Control Device>

Figure 3:
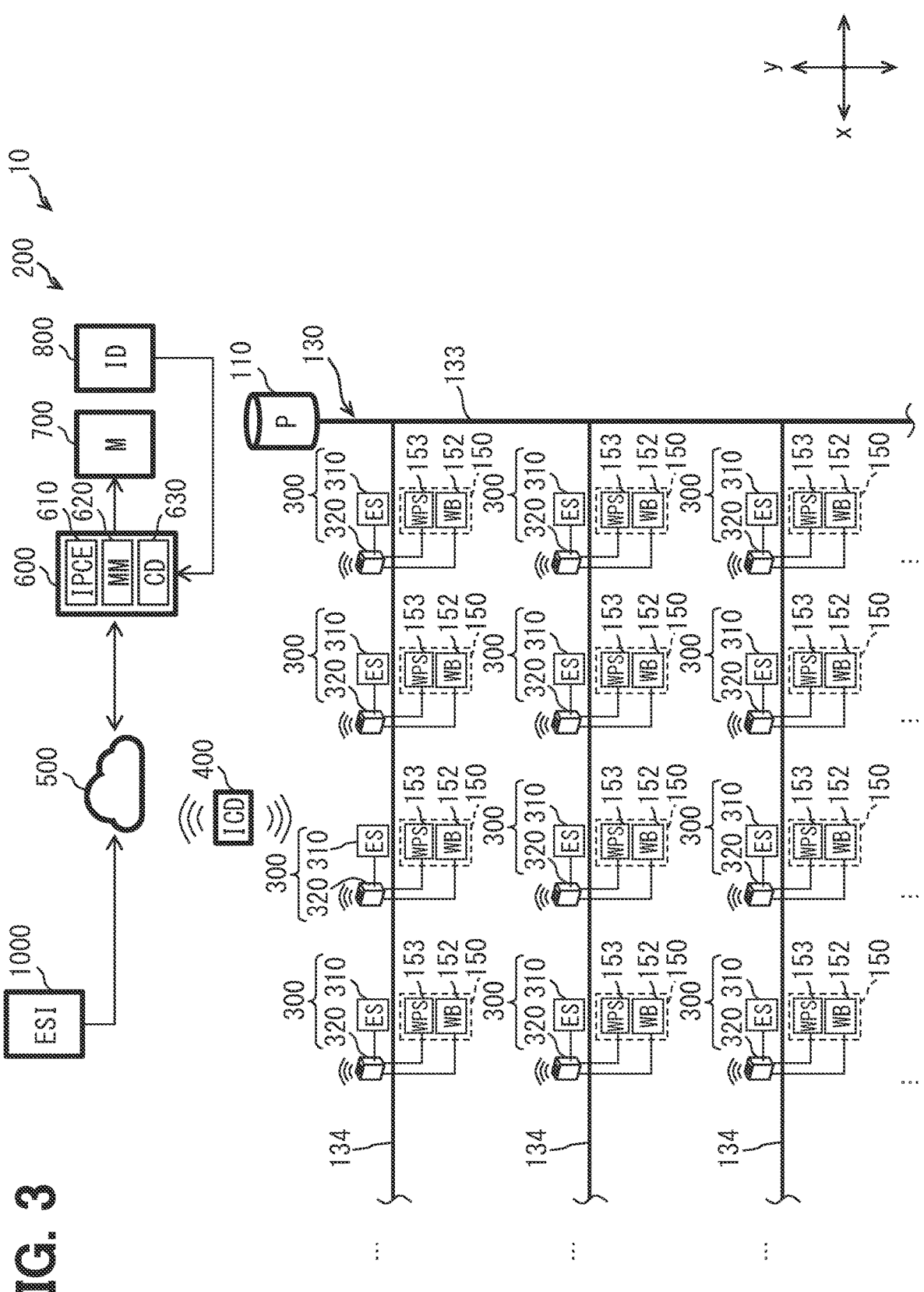
FIG. 3 is a schematic diagram illustrating the irrigation system.

As illustrated in FIGS. 1 and 3, the control device 200 includes a monitoring unit 300, an integrated communication unit 400, an information storage unit 500, and an integrated calculation unit 600. In the drawings, the integrated communication unit 400 is denoted as ICD.

The control device 200 includes a plurality of the monitoring units 300. The plurality of monitoring units 300 are provided in the farm field 20 together with the plurality of piping modules 150. The monitoring unit 300 and the piping module 150 are electrically connected.

The water pressure detected by the water pressure sensor 153 is input to the monitoring unit 300. The monitoring unit 300 detects a physical quantity related to the environment of the farm field 20 as an environment value. Each of the plurality of monitoring units 300 outputs the water pressure and the environment value to the integrated communication unit 400 through wireless communications.

The integrated communication unit 400 outputs the water pressure and the environment value, input from each of the plurality of monitoring units 300, to the information storage unit 500 through wireless communications. The water pressure and the environment value are stored in the information storage unit 500. The information storage unit 500 is what is known as cloud.

The integrated calculation unit 600 reads various types of information such as the water pressure and the environment value stored in the information storage unit 500. Then, the integrated calculation unit 600 appropriately processes the various types of information thus read, and displays the information on a monitor 700 of a smartphone or a personal computer of the user. In the drawings, the monitor 700 is denoted as M.

The integrated calculation unit 600 is included in the smartphone, the personal computer, and the like of the user. The integrated calculation unit 600 includes an information processing calculation device 610, a memory 620, and a communication device 630. In the drawings, the information processing calculation device 610 is denoted as IPCE, the memory 620 is denoted as MM, and the communication device 630 is denoted as CD.

The information processing calculation device 610 includes a processor. The information processing calculation device 610 performs calculation processing related to irrigation. Such a function is realized with an irrigation application program downloaded into the information processing calculation device 610.

The memory 620 is a non-transitory tangible storage medium that non-transiently stores various programs and various types of information readable by a computer or a processor. The memory 620 includes a volatile memory and a nonvolatile memory. The memory 620 stores various types of information input to the communication device 630 and a result of processing by the information processing calculation device 610. The information processing calculation device 610 executes various types of calculation processing based on the information stored in the memory 620.

The communication device 630 has a wireless communication function. The communication device 630 converts a received radio signal into an electrical signal and outputs the electrical signal to the information processing calculation device 610. The communication device 630 outputs the result of processing by the information processing calculation device 610 as a radio signal.

Hereinafter, in order to avoid complication of notation, the technical content of the present embodiment will be described using the integrated calculation unit 600 without particularly distinguishing among the information processing calculation device 610, the memory 620, and the communication device 630. The information processing calculation device 610 corresponds to the processing calculation unit.

The user inputs a user instruction related to an irrigation schedule to the integrated calculation unit 600 using an input device 800 such as a touch panel or a keyboard. The integrated calculation unit 600 determines the irrigation schedule based on the user instruction and various types of information read from the information storage unit 500. When there is no instruction from the user, the integrated calculation unit 600 automatically determines the irrigation schedule based on the various types of information. In the drawings, the input device 800 is denoted as ID.

Upon determining that an irrigation water supply start time point in the determined irrigation schedule has arrived, the integrated calculation unit 600 outputs an instruction signal for controlling opening/closing of the water supply valve 152 to the information storage unit 500. This instruction signal is input from the information storage unit 500 to the monitoring unit 300 through the integrated communication unit 400. The monitoring unit 300 controls whether to or not to output the discharge signal to the water supply valves 152, based on the instruction signal. Thus, the open/close state of water supply valve 152 is controlled. As a result, the supply of the irrigation water to the farm field 20 is controlled. At least one of the instruction signal and the discharge signal corresponds to the control signal.

<Divided Area>

As illustrated in FIG. 1, one monitoring unit 300 is provided for one drip pipe 132 together with the piping module 150. Therefore, as schematically illustrated in FIG. 3, the plurality of monitoring units 300, together with the water supply valves 152 and the water pressure sensors 153 of the plurality of piping modules 150, are arranged in a matrix in the farm field 20, with the x direction defined as a row direction and with the y direction defined as the column direction.

With this configuration, the environment of each of a plurality of divided areas defined by the row direction and the column direction is individually monitored by a corresponding one of the plurality of monitoring units 300 provided to the respective divided areas. Furthermore, the supply of the irrigation water in each of the plurality of divided areas is individually controlled by a corresponding one of the plurality of monitoring units 300 and a corresponding one of the plurality of piping modules 150.

<Monitoring Unit>

As illustrated in FIG. 3, the monitoring unit 300 includes an environment sensor 310 and a control unit 320. The water supply valves 152 and the water pressure sensor 153 of the piping module 150 are electrically connected to the control unit 320. In the drawings, the environment sensor 310 is denoted as ES, the water supply valve 152 is denoted as WB, and the water pressure sensor 153 is denoted as WPS.

The plurality of environment sensors 310 are arranged in matrix the farm field 20 together with the piping modules 150. The plurality of environment sensors 310 detect the environment values of the plurality of respective divided areas. The plurality of water pressure sensors 153 detect the water pressure of the plurality of respective divided areas. The environment value and the water pressure of each of the plurality of divided areas are stored in the information storage unit 500.

Figure 4:
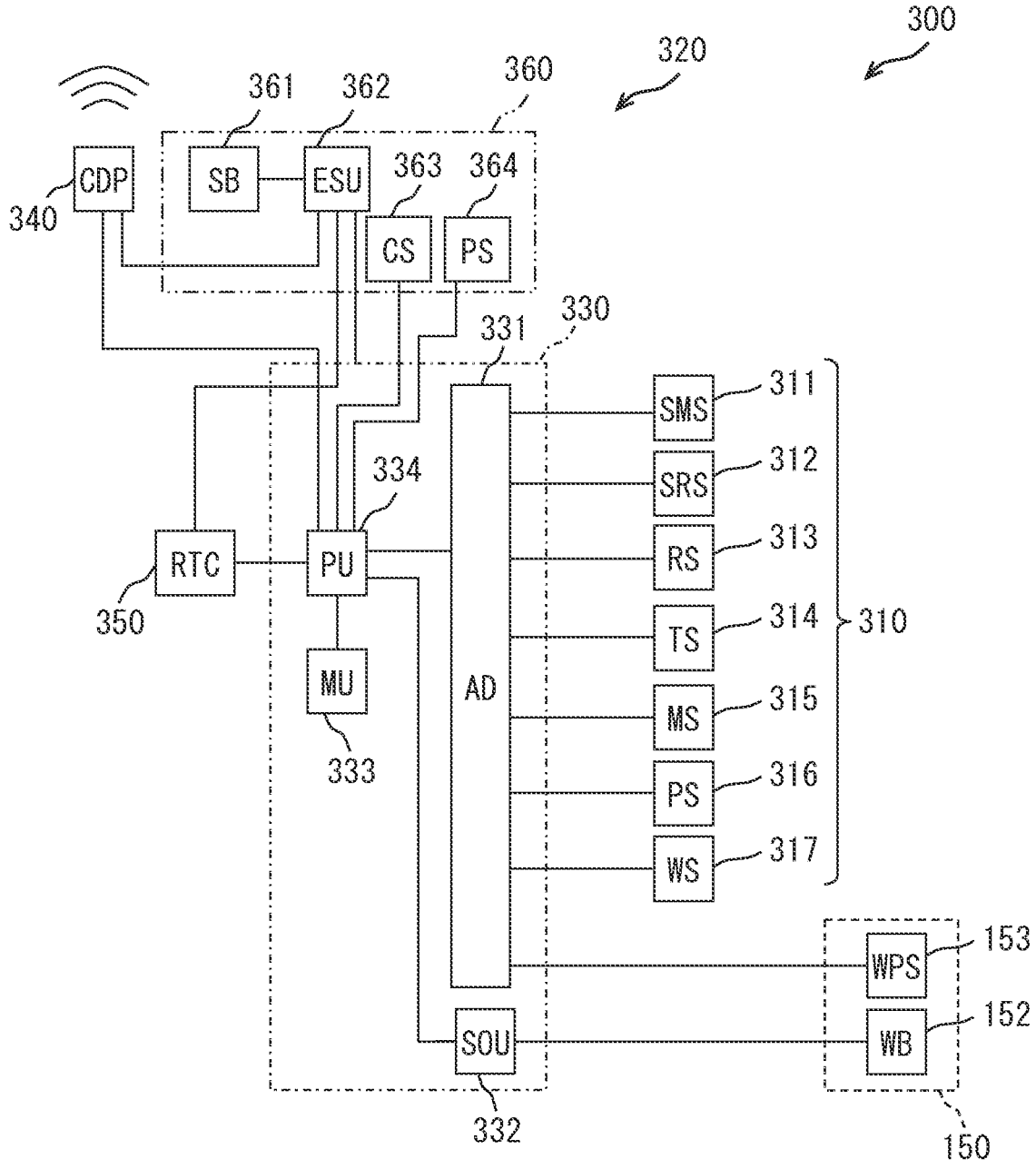
FIG. 4 is a block diagram illustrating a monitoring unit.

As illustrated in FIG. 4, the control unit 320 includes a microcomputer 330, a communication unit 340, an RTC 350, and a power generation unit 360. The microcomputer is an abbreviation for microcomputer. RTC stands for Real Time Clock. In the drawings, the communication unit 340 is denoted as CDP.

The environment value and the water pressure are input to the microcomputer 330. The microcomputer 330 outputs the environment value and the water pressure to the integrated communication unit 400 via the communication unit 340. The integrated communication unit 400 inputs an instruction signal to the microcomputer 330. The microcomputer 330 outputs the discharge signal to the water supply valve 152 based on the instruction signal. The microcomputer 330 corresponds to the calculation processing unit.

The microcomputer 330 has a sleep mode and a normal mode as operation modes. The sleep mode is a state under which the calculation processing by the microcomputer 330 is stopped. The normal mode is a state under which the calculation processing is executed by the microcomputer 330. The normal mode consumes more power than the sleep mode.

The communication unit 340 performs wireless communications with the integrated communication unit 400. The communication unit 340 outputs the electrical signal, output from the microcomputer 330, to the integrated communication unit 400 as a radio signal. Furthermore, the communication unit 340 receives the radio signal, output from the integrated communication unit 400, and converts the radio signal into an electrical signal. The communication unit 340 outputs the electrical signal to the microcomputer 330. When the electrical signal includes the instruction signal, microcomputer 330 switches from the sleep mode to the normal mode.

The RTC 350 has a clock function for keeping time and a timer function for measuring time. The RTC 350 outputs a wake-up signal to the microcomputer 330 when a preset time point arrives or when a preset time period elapses. When the wake-up signal is input to the microcomputer 330 under the sleep mode, microcomputer 330 switches from the sleep mode to the normal mode. The RTC 350 corresponds to the wake-up unit.

The power generation unit 360 converts light energy into electric energy. The power generation unit 360 serves as a power supply source for the monitoring units 300. Electric power is continuously supplied from the power generation unit 360 to the RTC 350. Thus, the clock function and the timer function of the RTC 350 are prevented from being impaired.

As described above, the position of the lateral pipe 134 in the z direction is more separated from the ground than the apices of the plants 30 fully grown are. The control unit 320 is mechanically connected to the lateral pipe 134. With such a configuration, incidence of sunlight onto the power generation unit 360 is less likely to be hindered by the plants 30 fully grown. Thus, the conversion of the light energy into the electric energy by the power generation unit 360 is less likely to be hindered.

<Environment Sensor>

The environment value anticipated to vary among the divided areas of the farm field 20 includes a soil moisture content. Each of the plurality of environment sensors 310 includes a soil moisture sensor 311 that detects a soil moisture content. The plurality of soil moisture sensors 311 detect the soil moisture contents of the plurality of respective divided areas. In the drawings, the soil moisture sensor 311 is denoted as SMS.

The environment value anticipated to vary among the divided areas of the farm field 20 depending on the undulations of the farm field 20 and the growth status of the plants 30 includes a solar radiation amount. In the present embodiment, each of the plurality of environment sensors 310 includes a solar radiation sensor 312 that detects the solar radiation amount. The plurality of solar radiation sensors 312 detect the solar radiation amounts of the plurality of respective divided areas. In the drawings, the solar radiation sensor 312 is denoted as SRS.

A soil moisture content distribution and a solar radiation amount distribution of the farm field 20 can be mapped and displayed on the monitor 700, by mapping the soil moisture contents and the solar radiation amounts detected in the plurality of respective divided areas in a form of a matrix. Similarly, the water pressure distribution of the water supply pipe 130 routed all over the farm field 20 can be mapped and displayed on the monitor 700, by mapping the water pressure detected by the plurality of water pressure sensors 153 provided to the plurality of respective divided areas in a form of a matrix. The integrated calculation unit 600 executed processing for such mapping display.

The environment values of the farm field 20 as a whole includes the rainfall amount, temperature, humidity, atmospheric pressure, and air volume. As sensors for detecting these, a rain sensor 313, a temperature sensor 314, a humidity sensor 315, an atmospheric pressure sensor 316, and a wind sensor 317 are provided. These are included in at least one environment sensor 310 of the plurality of monitoring units 300.

The environment sensor 310 of the monitoring unit 300 representatively illustrated in FIG. 4 includes various sensors that detect environment values of the farm field 20 as a whole. In the drawings, the rain sensor 313 is denoted as RS, the temperature sensor 314 is denoted as TS, the humidity sensor 315 is denoted as MS, the atmospheric pressure sensor 316 is denoted as PS, and the wind sensor 317 is denoted as WS. The wind sensor 317 may also detect the wind direction in addition to the air volume.

A configuration may be employed in which at least the rain sensors 313, the temperature sensors 314, the humidity sensors 315, the atmospheric pressure sensors 316, and/or the wind sensors 317 are arranged in matrix in the farm field 20.

Such a configuration is effective, for example, in a case where the rainfall amount, the temperature, the humidity, the atmospheric pressure, and the air volume are likely to greatly vary among the divided areas due to the farm field 20 being wide, having severe undulations, or being under a severe climate. By arranging the rainfall amount, the temperature, the humidity, the atmospheric pressure, and the air volume detected by these sensors in a matrix, these environment values can be mapped and displayed on the monitor 700.

A configuration may be employed in which the integrated communication unit 400 is provided with sensors detecting the environment values of the farm field 20 as a whole. With such a configuration, the outputs of these sensors are output to the communication unit 340 via the integrated communication unit 400. The outputs of these sensors are also stored in the information storage unit 500 via the integrated communication unit 400.

Such a configuration is effective, for example, in a case where the rainfall amount, the temperature, the humidity, the atmospheric pressure, and the air volume are less likely to greatly vary among the divided areas due to the farm field 20 being small, having moderate undulations, or being under a mild climate.

<Soil Moisture Content>

Of the various environment values described above, the soil moisture content is an environment value controlled by the irrigation system 10. The irrigation system 10 controls the supply time and amount of the irrigation water supplied to each divided area. Thus, the soil moisture content is individually controlled for each divided area.

The plants 30 are rooted in the soil layer of the farm field 20. The growth of the plants 30 depends on the amount of moisture contained in the soil of this soil layer (soil moisture content). When the soil moisture content exceeds the growth inhibition moisture point, the plants 30 are diseased. When the soil moisture content falls below the permanent wilting point, the plant 30 would never recover from the wilting.

Despite the fact that the growth inhibition moisture point and the permanent wilting point vary among the type of the plant 30, the values of these points have been known. The values are stored in the information storage unit 500.

The current value of the soil moisture content is detected by the soil moisture sensor 311. Examples of the physical quantity related to the soil moisture content include a soil moisture content tension (pF value) and a soil dielectric constant M. The soil moisture sensor 311 of the present embodiment detects the pF value.

The soil moisture content of the soil layer increases/decreases in response to a change in environment of the farm field 20. When it rains in the farm field 20, the soil moisture content increases. When water evaporates from the soil layer, the soil moisture content decreases. When the plant 30 absorbs moisture or water penetrates into the layer lower than the soil layer, the soil moisture content decreases.

The amount of rain (rainfall amount) falling on the soil layer is detected by the rain sensor 313.

The amount of moisture (evaporation amount) evaporated from the soil layer depends on the solar radiation amount, temperature, humidity, and air volume, which are detected by the solar radiation sensor 312, the temperature sensor 314, the humidity sensor 315, and the wind sensor 317.

The water absorption amount which is an amount of water absorbed by the plants 30 per unit time can be estimated in advance based on the type of the plants 30. The amount of water penetrating into a layer lower than the soil layer per unit time can be estimated in advance based on the water retention capacity of the soil. The estimation values are stored in the information storage unit 500.

As described above, each of the current value of the soil moisture content of the soil layer, predicted values related to prediction of an increase and decrease in the soil moisture content of the soil layer from the current value due to a change in environment are each detected by the environment sensor 310. These are stored in the information storage unit 500 as the environment values. The information storage unit 500 stores the growth inhibition moisture point and the permanent wilting point of the plants 30, the water absorption amount which is an amount of water absorbed by the plants 30 per unit time, and the water retention capacity of the soil. The instruction from the user described above (user instruction) is stored in the information storage unit 500. Thus, the information storage unit 500 stores various types of information for determining the irrigation schedule.

<Microcomputer>

As illustrated in FIG. 4, the microcomputer 330 includes an acquisition unit 331, a signal output unit 332, a storage unit 333, and a processing unit 334. In the drawings, the acquisition unit 331 is denoted as AD, the signal output unit 332 is denoted as SOU, the storage unit 333 is denoted as MU, and the processing unit 334 is denoted as PU.

The environment value detected by the environment sensor 310 is input to the acquisition unit 331. The water pressure detected by the water pressure sensor 153 is input to the acquisition unit 331. The acquisition unit 331 is electrically connected to each of the environment sensor 310 and the water pressure sensor 153. FIG. 1 representatively illustrates a wire 160 connecting the acquisition unit 331 and the soil moisture sensor 311, and connecting the acquisition unit 331 and the water pressure sensor 153.

The signal output unit 332 is electrically connected to the water supply valve 152. The signal output unit 332 outputs the discharge signal for controlling opening/closing of the water supply valve 152, to the water supply valve 152. The water supply valves 152 is in the closed state when the discharge signal is not input. The water supply valves 152 is in the open state when the discharge signal is input.

The storage unit 333 is a non-transitory tangible storage medium that non-transiently stores a program and data readable by a computer or a processor. The storage unit 333 includes a volatile memory and a nonvolatile memory. The storage unit 333 stores a program for the processing unit 334 to execute calculation processing. This program includes at least part of the above-described irrigation application program. In addition, the storage unit 333 temporarily stores data for the processing unit 334 to execute the calculation processing. The storage unit 333 stores various types of data input to each of the acquisition unit 331 and the communication unit 340, and acquisition time of the various types of data.

Upon receiving the wake-up signal from the RTC 350, the processing unit 334 transitions from the sleep mode to the normal mode. In the normal mode, the processing unit 334 reads the program and various types of data stored in the storage unit 333 and executes the calculation processing.

The processing unit 334 reads various sensor signals input to the acquisition unit 331 and the acquisition time of the instruction signal to the communication unit 340, from the RTC 350. The processing unit 334 stores the instruction signal and the acquisition time thereof in the storage unit 333.

The processing unit 334 stores the environment value and the water pressure input from the environment sensor 310 and the water pressure sensor 153, as well as the acquisition time thereof in the information storage unit 500 via the communication unit 340 and the integrated communication unit 400. The processing unit 334 outputs the discharge signal to the water supply valve 152 via the signal output unit 332 based on the instruction signal input from the integrated calculation unit 600 via the information storage unit 500, the integrated communication unit 400, and the communication unit 340.

<Communication Unit>

The communication unit 340 converts the electrical signal input from the processing unit 334 into a radio signal. The communication unit 340 outputs the radio signal to the integrated communication unit 400. The communication unit 340 converts the radio signal output from the integrated communication unit 400 into an electrical signal. The communication unit 340 outputs the electrical signal to the processing unit 334.

Figure 5:
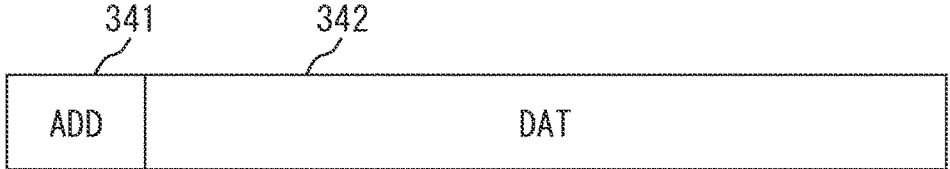
FIG. 5 is a schematic diagram illustrating a radio signal.

The radio signal output from the communication unit 340 includes an address 341 and data 342 as simply illustrated in FIG. 5. In the drawing, the address 341 is denoted as ADD, and the data 342 is denoted as DAT.

As illustrated in FIG. 3, the radio signals are transmitted and received between the plurality of communication units 340 and the integrated communication unit 400. The address 341 included in the radio signal is an identification code indicating from which of the plurality of communication units 340 the radio signal is output. In other words, the address included in the radio signal is an identification code indicating from which of the plurality of processing unit 334 the radio signal is output. The unique address 341 is stored in each of the plurality of storage units 333.

The radio signal output from the integrated communication unit 400 also includes the address 341. The data 342 of the radio signal includes an instruction signal. Each of the plurality of communication units 340 receives this radio signal.

This radio signal is converted into an electrical signal by each of the plurality of communication units 340. Then, the electrical signal is input to each of the plurality of processing units 334. Among the plurality of processing units 334, only the processing unit 334 having the same address 341 as the address 341 included in the electrical signal executes calculation processing based on the electrical signal.

As described below, the microcomputer 330 is intermittently driven with the sleep mode and the normal mode alternately repeated. Therefore, wireless communications between the communication unit 340 and the integrated communication unit 400 are infrequently performed. A time interval during which wireless communications are performed between the communication unit 340 and the integrated communication unit 400 is long. Thus, a large amount of data can be included in the data 342 for a single wireless communication.

<Power Generation Unit>

The power generation unit 360 includes a solar cell 361, a power storage unit 362, a current sensor 363, and a power sensor 364. In the drawings, the solar cell 361 is denoted by SB, the power storage unit 362 is denoted by ESU, the current sensor 363 is denoted by CS, and the power sensor 364 is denoted by PS.

The solar cell 361 converts light energy into electric energy. The power storage unit 362 stores the electric energy (electric power). The electric power stored in the power storage unit 362 is utilized as the driving power for the monitoring units 300.

The current sensor 363 detects current output from the solar cell 361 to the power storage unit 362. The power sensor 364 detects electric power output from the power storage unit 362. The processing unit 334 also stores the current and the electric power in the information storage unit 500 via the communication unit 340 and the integrated communication unit 400.

The driving power for the monitoring units 300 depends on the electric power generated by the power generation unit 360. Therefore, when the amount of light incident on the power generation unit 360 is small, the driving power of monitoring unit 300 might be depleted. In order to avoid this, the microcomputer 330 of the monitoring unit 300 is intermittently driven.

<RTC>

The RTC 350 outputs the wake-up signal to the microcomputer 330 every time the above-described time interval of the intermittent driving (wake-up interval) elapses. Thus, the microcomputer 330 repeatedly transitions between the sleep mode and the normal mode.

The integrated calculation unit 600 determines the wake-up interval described above based on the amount of electric power (power storage amount) stored in the power storage unit 362. In other words, the integrated calculation unit 600 determines the intermittent driving interval based on the power storage amount.

The integrated calculation unit 600 calculates the power storage amount based on the electric power stored in the information storage unit 500. The integrated calculation unit 600 sets a longer intermittent driving interval for a smaller power storage amount. Conversely, the integrated calculation unit 600 sets a shorter intermittent driving interval for a larger power storage amount.

The integrated calculation unit 600 provides the intermittent driving interval in the instruction signal. The processing unit 334 of the microcomputer 330 adjusts the intermittent driving interval upon acquiring the instruction signal. Thus, the processing unit 334 adjusts the wake-up interval of the RTC 350.

A massive change in the environment of the farm field 20 rarely occurs in units of several seconds. Thus, the intermittent driving interval is set to be several tens of seconds to several tens of hours. Accordingly, a time period during which the wireless communications are performed is set to be several tens of seconds to several tens of hours.

<Driving of Irrigation System>

As described above, in the irrigation system 10, signals are transmitted and received between the plurality of monitoring units 300 and the integrated calculation unit 600, and various pieces of data are stored in the information storage unit 500. Each of the plurality of monitoring units 300 and the integrated calculation unit 600 executes a cycle task to be processed in each wake-up interval and an event task to be processed irregularly.

Priorities are given to these cycle and event tasks. When the tasks are to be processed at the same timing, the processing for the event task is prioritized over the processing for the cycle task.

Figure 6:
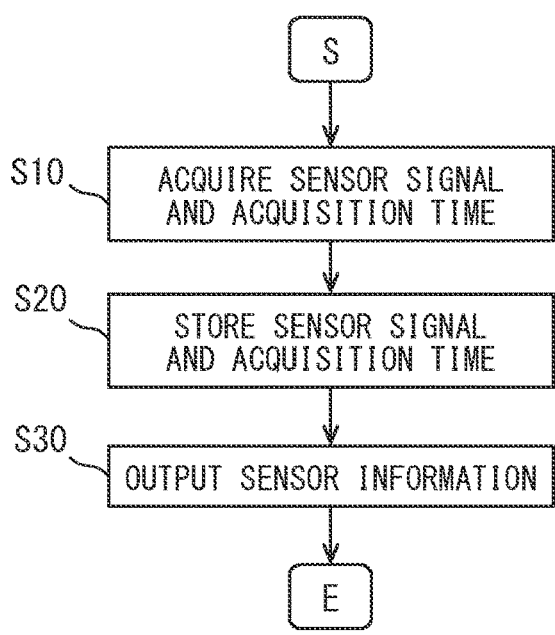
FIG. 6 is a flowchart illustrating sensor processing.

As the cycle task, each of the plurality of monitoring units 300 executes sensor processing illustrated in FIG. 6. The integrated calculation unit 600 executes update processing illustrated in FIG. 7.

Figure 8:
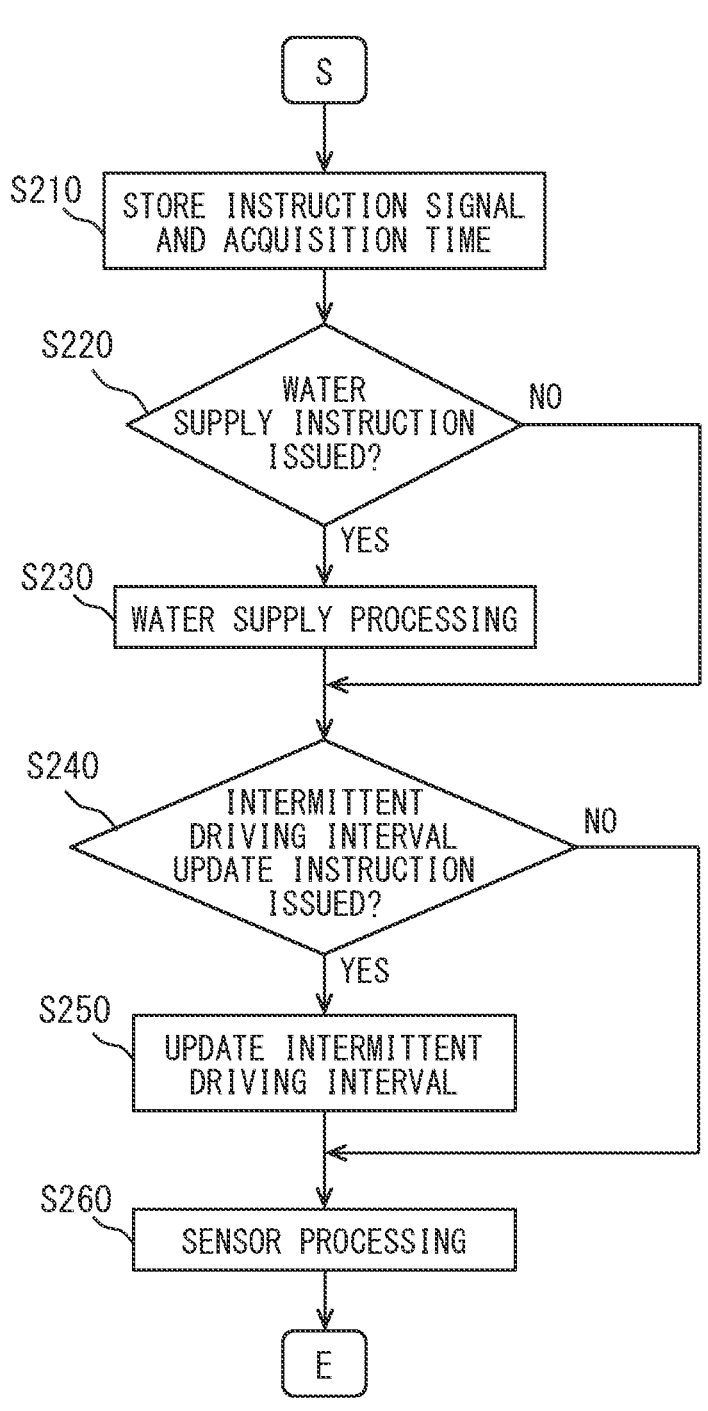
FIG. 8 is a flowchart illustrating monitoring processing.
Figure 9:
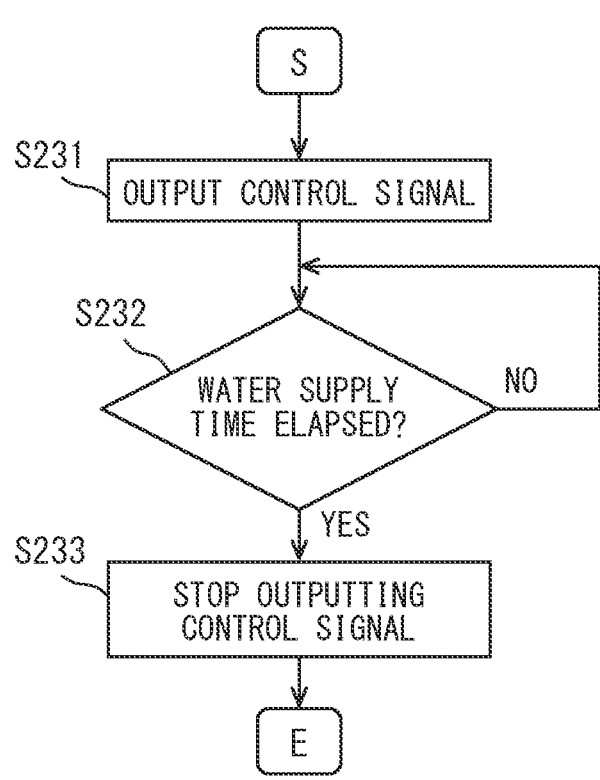
FIG. 9 is a flowchart illustrating water supply processing.

As the event task, each of the plurality of monitoring units 300 executes monitoring processing illustrated in FIG. 8 and water supply processing illustrated in FIG. 9. The integrated calculation unit 600 executes irrigation processing illustrated in FIG. 10, user update processing illustrated in FIG. 11, and forced update processing illustrated in FIG. 12.

The sensor processing and the update processing as the cycle task are described below based on FIGS. 6 and 7. In each of the drawings which are flowcharts, the start is denoted as S and the end is denoted as E.

<Sensor Processing>

Before the start in FIG. 6, the microcomputer 330 of the monitoring unit 300 is in the sleep mode. This microcomputer 330 receives the wake-up signal from the RTC 350. Thus, the microcomputer 330 is switched from the sleep mode to the normal mode. Then, the microcomputer 330 starts executing the sensor processing illustrated in FIG. 6. This sensor processing is executed at the intermittent driving interval of the microcomputer 330.

In step S10, the microcomputer 330 acquires sensor signals input from various sensors. Then, the microcomputer 330 acquires the acquisition time of the sensor signal based on the output of the RTC 350. Thereafter, the microcomputer 330 proceeds to step S20.

Upon proceeding to step S20, the microcomputer 330 stores each of the acquired sensor signal and the acquisition time. Thereafter, the microcomputer 330 proceeds to step S30.

Upon proceeding to step S30, the microcomputer 330 outputs the sensor signal and the acquisition time as the sensor information from the communication unit 340 to the integrated communication unit 400 through wireless communications. The integrated communication unit 400 stores this sensor information in the information storage unit 500. The microcomputer 330 transitions to the sleep mode and ends the sensor processing.

<Update Processing>

Figure 7:
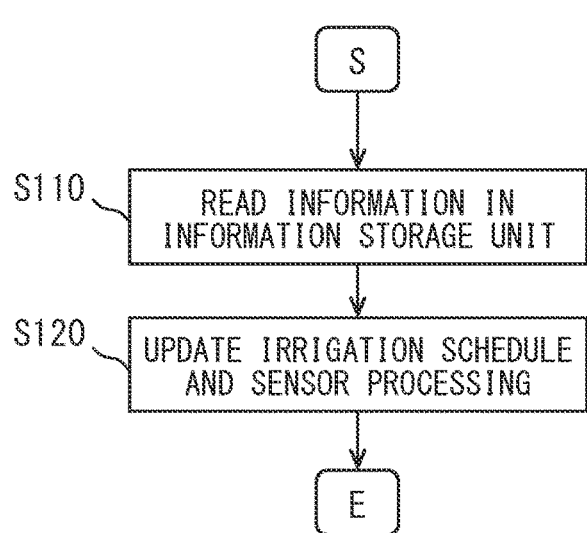
FIG. 7 is a flowchart illustrating update processing.

The integrated calculation unit 600 executes the update processing illustrated in FIG. 7 each time an update cycle elapses. This update cycle is substantially the same as the intermittent driving interval of the microcomputer 330.

In step S110, the integrated calculation unit 600 reads various types of information stored in the information storage unit 500. Then, the integrated calculation unit 600 proceeds to step S120.

Upon proceeding to step S120, the integrated calculation unit 600 updates the irrigation schedule of each of the plurality of monitoring units 300 based on the various types of information read. The integrated calculation unit 600 updates the sensor processing by each of the plurality of monitoring units 300. Specifically, the integrated calculation unit 600 updates the intermittent driving interval corresponding to the execution timing of the sensor processing. The integrated calculation unit 600 holds the updated irrigation schedule and intermittent driving interval and also stores the same in the information storage unit 500. Then, the information storage unit 500 ends the update processing.

In the manner described above, the sensor information, the irrigation schedule, and the intermittent driving interval are updated by the cycle task.

Next, the monitoring processing, the water supply processing, the irrigation processing, the user update processing, and the forced update processing that are the event task will be described based on FIGS. 8 to 12. Each of the monitoring processing, the water supply processing, and the irrigation processing is executed in daytime in order to avoid depletion of the driving power for the monitoring unit 300. Whether it is currently daytime can be determined based on the current time, the solar radiation amount detected by the solar radiation sensor 312, and the like.

<Monitoring Processing>

Before the start in FIG. 8, the microcomputer 330 of the monitoring unit 300 is in the sleep mode. The integrated calculation unit 600 inputs the instruction signal to this microcomputer 330 through wireless communications. As a result, the microcomputer 330 is switched from the sleep mode to the normal mode. Then, the microcomputer 330 starts executing the monitoring processing illustrated in FIG. 8.

In step S210, the microcomputer 330 stores the instruction signal input and the acquisition time of the same. Thereafter, the microcomputer 330 proceeds to step S220.

Upon proceeding to step S220, the microcomputer 330 determines whether the instruction signal includes a water supply instruction for making the water supply valves 152 transition from the closed state to the open state. When the instruction signal includes the water supply instruction, the microcomputer 330 proceeds to step S230. When the instruction signal includes no water supply instruction, the microcomputer 330 proceeds to step S240.

Upon proceeding to step S230, the microcomputer 330 executes the water supply processing illustrated in FIG. 9. Specifically, in step S231, the microcomputer 330 outputs the discharge signal to the water supply valve 152 according to the water supply instruction. Thereafter, the microcomputer 330 proceeds to step S232.

Upon proceeding to step S232, the microcomputer 330 determines whether water supply time included in the instruction signal has elapsed. When the water supply time has not elapsed yet, the microcomputer 330 continues outputting the discharge signal to the water supply valve 152. When the water supply time has elapsed, the microcomputer 330 proceeds to step S233.

Upon proceeding to step S233, the microcomputer 330 stops outputting the discharge signal. Thereafter, the microcomputer 330 proceeds to step S240 illustrated in FIG. 8.

Upon proceeding to step S240, the microcomputer 330 determines whether the instruction signal includes an update instruction for the intermittent driving interval. When the instruction signal includes the update instruction for the intermittent driving interval, the microcomputer 330 proceeds to step S250. When the instruction signal includes no update instruction for the intermittent driving interval, the microcomputer 330 proceeds to step S260.

The update instruction for the intermittent driving interval described above is periodically or randomly output to each of the plurality of monitoring units 300 from the integrated calculation unit 600 or the information storage unit 500 as the instruction signal.

Upon proceeding to step S250, the processing unit 334 of the microcomputer 330 adjusts the time interval during which the wake-up signal from the RTC 350 is output. Thereafter, the microcomputer 330 proceeds to step S260.

Upon proceeding to step S260, the microcomputer 330 executes the sensor processing described based on FIG. 6. When the microcomputer 330 executes the water supply processing in step S230, the environment value after the irrigation water supply is detected in step S260. When the microcomputer 330 does not execute the water supply processing in step S260, the environment value without the irrigation water supply is detected in step S260. The environment value is stored in the information storage unit 500. Upon finishing the sensor processing, the microcomputer 330 transitions to the sleep mode, and ends the monitoring processing.

<Irrigation Processing>

Figure 10:
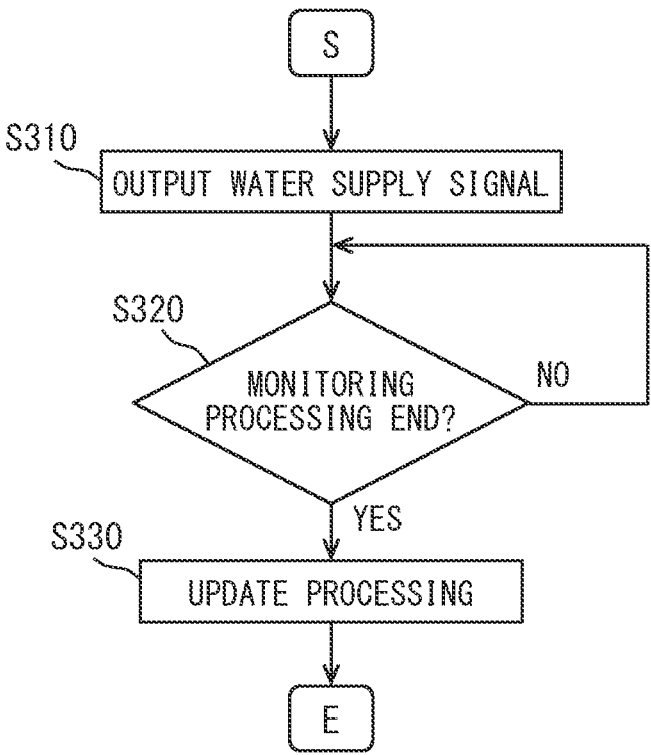
FIG. 10 is a flowchart illustrating irrigation processing.

The integrated calculation unit 600 executes the irrigation processing illustrated in FIG. 10 every time the irrigation water supply timing arrives in the irrigation schedule of each of the plurality of monitoring units 300.

In step S310, the integrated calculation unit 600 outputs an instruction signal (water supply signal) including a water supply instruction to the monitoring unit 300 for the divided area to which the irrigation water is scheduled to be supplied among the plurality of monitoring units 300. Then, the integrated calculation unit 600 proceeds to step S320.

The water supply instruction includes discharge signal output start and discharge signal output time (water supply time). Upon receiving the water supply instruction, the monitoring unit 300 executes the monitoring processing described based on FIG. 8.

Upon proceeding to step S320, the integrated calculation unit 600 stays in a standby state until the monitoring processing by the monitoring unit 300 ends. When the monitoring processing ends, the integrated calculation unit 600 proceeds to step S330.

Whether the monitoring processing has ended can be determined based on whether the expected time until the end of the monitoring processing has elapsed for example. Furthermore, the determination can be made by inquiring the monitoring unit 300 of whether the monitoring processing has ended. A method of determining whether the monitoring processing has ended is not particularly limited.

Upon proceeding to step S330, the integrated calculation unit 600 executes the update processing described based on FIG. 7. Thus, the irrigation schedule is updated based on the environment value after the irrigation water supply.

Note that the irrigation water supply start time points in at least some of the irrigation schedules of the plurality of monitoring units 300 provided for the plurality of respective divided areas may be uniformly set to be the same. Still, the requested supply amount of irrigation water is expected to vary among the plurality of divided areas. Therefore, even if the irrigation water supply start time points in the plurality of divided areas are uniformly set to be the same, the irrigation water supply end times in the plurality of divided areas are the same or different.

With such a configuration, in step S310, the integrated calculation unit 600 outputs the water supply signal toward at least part of the plurality of monitoring units 300 provided for the plurality of respective divided areas. In step S320, the integrated calculation unit 600 is in the standby state until the monitoring processing by the monitoring unit 300 in the divided area with the longest water supply time among the plurality of irrigation schedules ends.

<User Update Processing>

Figure 11:
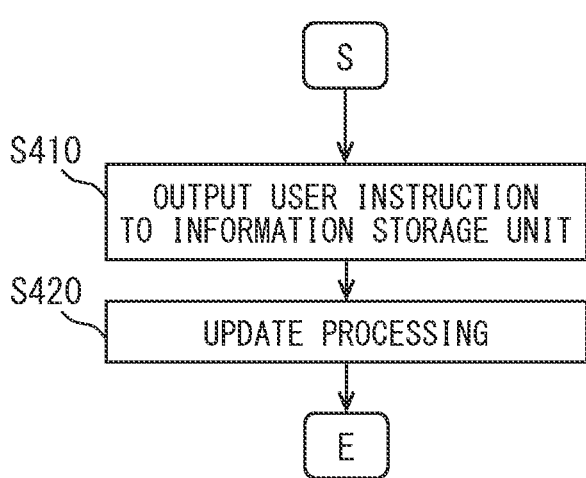
FIG. 11 is a flowchart illustrating user update processing.

The integrated calculation unit 600 executes the user update processing illustrated in FIG. 11 when a user instruction related to adjustment of the irrigation schedule and the intermittent driving interval is input from the input device 800.

In step S410, the integrated calculation unit 600 stores the user instruction input, in the information storage unit 500. Then, the integrated calculation unit 600 proceeds to step S420.

Upon proceeding to step S420, the integrated calculation unit 600 executes the update processing described based on FIG. 7. Thus, the irrigation schedule and the intermittent driving interval are updated based on the user instruction.

<Forced Update Processing>

Figure 12:
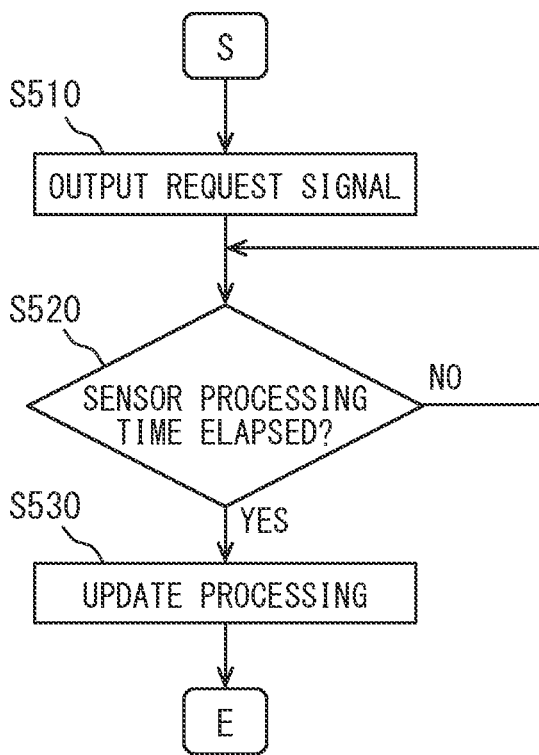
FIG. 12 is a flowchart illustrating forced update processing.

The integrated calculation unit 600 executes the forced update processing illustrated in FIG. 12 when a user instruction related to update of the irrigation schedule and the intermittent driving interval is input.

In step S510, the integrated calculation unit 600 outputs an instruction signal (request signal) including a request instruction for requesting for execution of the sensor processing. This request signal is output to the monitoring unit 300 through wireless communications. Then, the integrated calculation unit 600 proceeds to step S520.

Upon proceeding to step S520, the integrated calculation unit 600 stays in a standby state until the sensor processing by the monitoring unit 300 ends. When the sensor processing ends, the integrated calculation unit 600 proceeds to step S530.

Whether the sensor processing has ended can be determined based on whether the expected time until the end of the sensor processing has elapsed for example. Furthermore, the determination can be made by inquiring the monitoring unit 300 of whether the sensor processing has ended. A method of determining whether the sensor processing has ended is not particularly limited.

Upon proceeding to step S530, the integrated calculation unit 600 executes the update processing described based on FIG. 7. Thus, the irrigation schedule and the intermittent driving interval are updated based on various pieces of data at the time of user update request.

<Individual Irrigation Processing>

As described above based on FIGS. 6 to 12, in the present embodiment, the irrigation schedule in each of the plurality of divided areas is determined by the integrated calculation unit 600. The integrated calculation unit 600 controls the irrigation water supply based on each of the plurality of irrigation schedules.

A configuration may be employed in which the integrated calculation unit 600 determines the irrigation schedule for each of the plurality of divided areas, each of the plurality of monitoring units 300 individually controls the irrigation water supply based on a corresponding one of the plurality of irrigation schedules.

Figure 13:
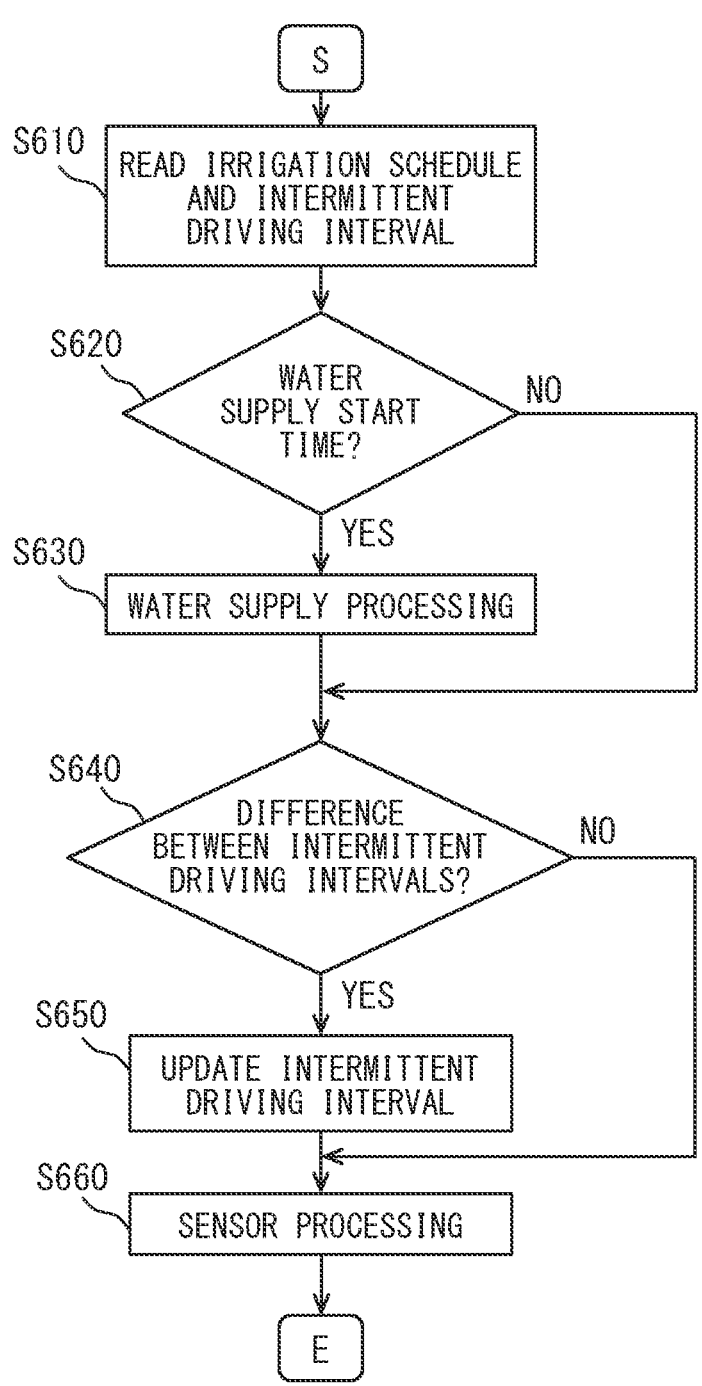
FIG. 13 is a flowchart illustrating individual irrigation processing.

In such a modification, instead of the sensor processing illustrated in FIG. 6 and the irrigation processing illustrated in FIG. 10, the monitoring unit 300 executes individual irrigation processing illustrated in FIG. 13.

Before the start in FIG. 13, the microcomputer 330 of the monitoring unit 300 is in the sleep mode. Upon receiving the wake-up signal from the RTC 350, the microcomputer 330 switches from the sleep mode to the normal mode. Then, the microcomputer 330 starts executing the individual irrigation processing illustrated in FIG. 13. The individual irrigation processing is executed at the intermittent driving interval of the microcomputer 330. The monitoring unit 300 executes the individual irrigation processing as the cycle task.

In step S610, the microcomputer 330 reads the irrigation schedule and the intermittent driving interval stored in the information storage unit 500. Thereafter, the microcomputer 330 proceeds to step S620.

Upon proceeding to step S620, the microcomputer 330 determines whether the current time is after the irrigation water supply start time point in the irrigation schedule read. When the current time is after the irrigation water supply start time point, the microcomputer 330 proceeds to step S630. When the current time is before the irrigation water supply start time point, the microcomputer 330 proceeds to step S640.

Upon proceeding to step S630, the microcomputer 330 executes the water supply processing illustrated in FIG. 9. Thereafter, the microcomputer 330 proceeds to step S640.

Upon proceeding to step S640, the microcomputer 330 compares the intermittent driving interval read with the intermittent driving interval stored. When there is a difference therebetween, the microcomputer 330 proceeds to step S650. When there is no difference therebetween, the microcomputer 330 proceeds to step S660.

Upon proceeding to step S650, the processing unit 334 of the microcomputer 330 adjusts the time interval during which the wake-up signal from the RTC 350 is output. As a result, the intermittent driving interval is updated. Thereafter, the microcomputer 330 proceeds to step S660.

Upon proceeding to step S660, the microcomputer 330 executes the sensor processing described based on FIG. 6. Upon finishing the sensor processing, the microcomputer 330 transitions to the sleep mode, and ends the individual irrigation processing.

A water supply start signal may be set to be output from the RTC 350 at the water supply start time included in the irrigation schedule read in advance. The microcomputer 330 may execute the water supply processing illustrated in FIG. 9 upon receiving the water supply start signal.

<Independent Update>

As a further example, a configuration may be employed in which each of the monitoring units 300 can independently determine the irrigation schedule for a corresponding one of the plurality of divided areas. In such a configuration, each of the plurality of monitoring units 300 executes the update processing illustrated in FIG. 7.

In step S110, each of the plurality of monitoring units 300 reads various types of information stored in the information storage unit 500, such as the user instruction from the user, the growth inhibition moisture point and the permanent wilting point of the plants 30, the water absorption amount that is an amount of water absorbed by the plants 30 per unit time, and the water retention capacity of the soil. Furthermore, each of the plurality of monitoring units 300 acquires the environment value detected by the environment sensor 310.

Note that the plurality of monitoring units 300 may be unable to read various types of information stored in the information storage unit 500 due to a communication failure. In view of this, in the configuration described above, the plurality of monitoring units 300 each stores the various types of information read from the information storage unit 500. When the stored information is not updated due to a communication failure or the like, each of the plurality of monitoring units 300 determines the irrigation schedule based on the non-updated information and the environment value detected by the environment sensor 310. Alternatively, each of the plurality of monitoring units 300 determines the irrigation schedule based on the environment value detected by the environment sensor 310.

<Monitoring Unit Communication>

In a case where the farm field 20 is wide, has severe undulations, or is under severe weather, information transmission between the integrated calculation unit 600 and each of the plurality of monitoring units 300 may fail due to a communication failure. The wireless communications between the integrated communication unit 400 and each of the plurality of monitoring units 300 may fail.

Without taking into consideration the undulations of and an obstacle in the farm field 20 hindering the communications, the monitoring unit 300 with a short separation distance from the integrated communication unit 400 is expected to be less likely to have a communication failure with the integrated communication unit 400, compared with the monitoring unit 300 with a long separation distance from the integrated communication unit 400.

Therefore, for example, among the plurality of monitoring units 300, the monitoring unit 300 with a short separation distance from the integrated communication unit 400 is defined as a child device, and the monitoring unit 300 having a long separation distance is referred to as a grandchild device. Thus, a configuration may be employed in which wireless communications between the integrated communication unit 400 and the grandchild device are performed via the child device.

<Weather Forecast and Irrigation Schedule>

As described above, the information storage unit 500 stores the current value of the soil moisture content, the change/decrease predicted value, and the user instruction. The information storage unit 500 stores the growth inhibition moisture point and the permanent wilting point of the plants 30, the water absorption amount which is an amount of water absorbed by the plants 30 per unit time, and the water retention capacity of the soil.

Furthermore, the information storage unit 500 stores the weather forecast for the farm field 20 output/distributed from an external information source 1000 as illustrated in FIG. 1 and FIG. 3. In the drawings, the external information source 1000 is denoted as ESI.

In S110 of the update processing described based on FIG. 7, the integrated calculation unit 600 reads various types of information including the weather forecast from the information storage unit 500. Then, in S120, the integrated calculation unit 600 determines the irrigation schedule for each of the plurality of monitoring units 300.

<Damage Detection>

The water supply pipe 130 and the water supply valve 152 are provided in the open farm field 20. Therefore, the water supply pipe 130 and the water supply valve 152 may be damaged due to aging deterioration or by harmful animals. When the damage in the water supply pipe 130 and the water supply valve 152 is minor, it may be difficult to detect the damage.

When the damage in the water supply pipe 130 and the water supply valve 152 is minor, the amount of irrigation water leaking from the damaged portion is minute. Therefore, in a stable state where the water supply valve 152 is in the closed state and the water supply pipe 130 is filled with irrigation water, it is assumed that the pump pressure is detected by the water pressure sensor 153. In a stable state where the water supply valve 152 is in the open state and the flow of the irrigation water in the water supply pipe 130 hardly changes, it is assumed that the flow pressure is detected by the water pressure sensor 153.

However, even if the amount of irrigation water leaking from the damaged portion is minute because the damage is minor, whether the minor damage has occurred can be detected by adopting the following method.

When the water supply valve 152 is transitioned from the open state to the closed state, the water pressure is going to recover from the flow pressure to the pump pressure. During this transition period of the water pressure recovering from the flow pressure to the pump pressure, irrigation water continuously leaks from the damaged portion. For this reason, the speed (time constant) of the temporal change of the water pressure in this transition period is somewhat delayed even if the damage in the water supply pipe 130 or the water supply valve 152 is minor. Therefore, by detecting this time constant, whether damage has occurred in the water supply pipe 130 or the water supply valve 152 can be determined. In the present embodiment, such damage determination processing based on the water pressure is performed by the microcomputer 330 of each of the plurality of monitoring units 300. The monitoring units 300 correspond to the inspection device.

<Damage Determination Processing>

Figure 14:
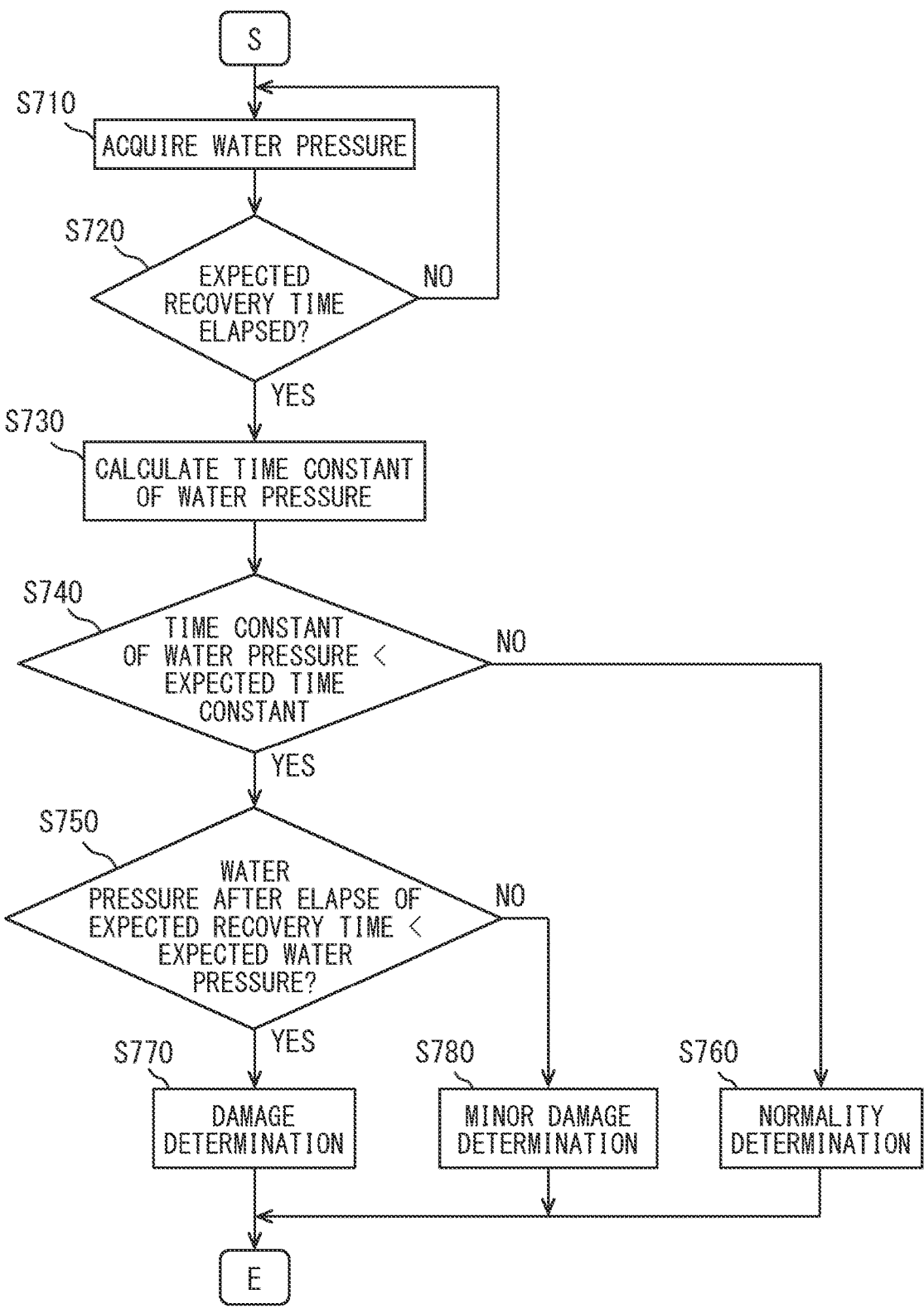
FIG. 14 is a flowchart illustrating damage determination processing.

In the water supply processing in step S230 of the monitoring processing described based on FIG. 8, the microcomputer 330 executes damage determination processing illustrated in FIG. 14. This damage determination processing is executed in or after step S233 of the water supply processing described based on FIG. 9. The microcomputer 330 includes an expected recovery time, an expected time constant, and an expected water pressure as comparison values for performing this damage determination processing. An inspection program for executing this damage determination processing is stored in at least one of the storage unit 333 and the information storage unit 500.

In step S710 illustrated in FIG. 14, the microcomputer 330 acquires and stores the water pressure from the water pressure sensor 153. The water pressure acquired at this point is expected to be a value between the flow pressure and the pump pressure. Thereafter, the microcomputer 330 proceeds to step S720.

Upon proceeding to step S720, the microcomputer 330 determines whether the expected recovery time has elapsed after the stop of output of the discharge signal. When the expected recovery time has not elapsed yet, the microcomputer 330 repeats step S710 to continue to acquire and store the water pressure. When the expected recovery time has elapsed, the microcomputer 330 proceeds to step S730.

Note that the expected recovery time is determined based on a period of time after which the water pressure with no damage occurring is expected to recover from the flow pressure to the pump pressure when the water supply valve 152 is transitioned from the open state to the closed state. For example, the expected recovery time can be set to the same extent as this period of time. The expected recovery time corresponds to the expected time.

Upon proceeding to step S730, the microcomputer 330 calculates the temporal change in water pressure during the transition period in which the water pressure recovers from the flow pressure to the pump pressure based on a plurality of water pressures acquired until the elapse of the expected recovery time. That is, the microcomputer 330 calculates the time constant of the water pressure. Thereafter, the microcomputer 330 proceeds to step S740.

Upon proceeding to step S740, the microcomputer 330 determines whether the calculated time constant of the water pressure is lower than the expected time constant. When the time constant of the water pressure is lower than the expected time constant, the microcomputer 330 proceeds to step S750. When the time constant of the water pressure is higher than the expected time constant, the microcomputer 330 proceeds to step S760.

The expected time constant is determined based on the time constant when the water pressure with no damage occurring recovers from the flow pressure to the pump pressure. For example, the expected time constant can be set to a value obtained by subtracting the detection error of the water pressure from this time constant.

Upon proceeding to step S750, the microcomputer 330 determines whether the water pressure at the elapse of the expected recovery time is lower than the expected water pressure. When this water pressure is lower than the expected water pressure, the microcomputer 330 proceeds to step S770. When this water pressure is higher than the expected water pressure, the microcomputer 330 proceeds to step S780.

The expected water pressure is determined based on the pump pressure with no damage occurring. For example, the expected water pressure can be set to a value obtained by subtracting the detection error of the water pressure from this pump pressure.

Upon proceeding to step S770, the microcomputer 330 determines that damage has occurred in the water supply pipe 130 or the water supply valve 152 because the time constant is lower than the expected time constant and the water pressure at the elapse of the expected recovery time has not reached the expected water pressure.

Upon proceeding to step S780, the microcomputer 330 determines that minor damage has occurred in the water supply pipe 130 or the water supply valve 152 because the time constant is lower than the expected time constant and the water pressure at the elapse of the expected recovery time has reached the expected water pressure.

Upon proceeding to step S760, the microcomputer 330 determines that the water supply pipe 130 and the water supply valve 152 are normal because the time constant is higher than the expected time constant.

The results of the damage determination, the minor damage determination, and the normality determination described above are input from the microcomputer 330 to the integrated calculation unit 600.

In the present embodiment, an example in which the microcomputer 330 executes the damage determination processing is described. However, after the microcomputer 330 has executed step S710 and step S720 of the damage determination processing, the integrated calculation unit 600 may execute step S730 and the subsequent steps of the damage determination processing in response to the acquired results of the water pressure. In this configuration, the monitoring unit 300 and the integrated calculation unit 600 are included in the inspection device. One of the microcomputer 330 and the integrated calculation unit 600 corresponds to the inspection unit.

Operations and Effects

As described above, the time zone in which irrigation water is supplied from the water supply pipe 130 to the farm field 20 and the time zone in which the water supply pipe 130 is inspected are the same time zone. That is, the time zone in which the water supply processing described based on FIG. 9 and the time zone in which the damage determination processing described based on FIG. 14 are executed are the same time zone such as daytime for example. Therefore, the possibility of the processing work becoming cumbersome is suppressed.

The electric power generated by the solar cell 361 is stored in the power storage unit 362. The microcomputer 330 is driven by the electric power stored in the power storage unit 362. The microcomputer 330 executes the water supply processing and the damage determination processing described above. The water supply processing is performed in the daytime. Therefore, the damage determination processing is also executed in the daytime.

Therefore, for example, unlike a configuration in which the damage determination processing is executed at night when power generation by the solar cell 361 is not expected, a significant decrease in the power storage amount of the power storage unit 362 due to the driving of the microcomputer 330 is suppressed.

Based on the time constant of the water pressure and the water pressure at the elapse of the recovery time, whether the water supply pipe 130 or the water supply valve 152 is damaged can be determined. Even if the damage in the water supply pipe 130 is so minor that the water pressure at the elapse of the expected recovery time can be recovered to about the expected water pressure based on the pump pressure, the time constant is expected to be somewhat delayed. Therefore, by inspecting the water supply pipe 130 based on the time constant, whether even minor damage has occurred in the water supply pipe 130 can be detected.

<Failure Determination of Water Pressure Sensor>

As described above, the first branch pipe 136a and the second branch pipe 136b are connected to one extension pipe 135. The water pressure sensor 153 is provided on each of the two connection ports of the extension pipe 135 connected to the first branch pipe 136a and the second branch pipe 136b.

When no damage has occurred in the water supply pipe 130 and the water supply valves 152 of the first branch pipe 136a and the second branch pipe 136b are in the same open/close state, the absolute value of the difference between the water pressures detected by these two water pressure sensors 153 is expected to fall within a detection error range. However, when the absolute value of the difference exceeds the detection error range, it can be determined that a failure has occurred in any one of the two water pressure sensors 153.

<Irrigation Water Supply Amount>

As described above, the opening and closing of the water supply valve 152 is controlled for each divided area. As illustrated in FIG. 1, the plurality of drip pipes 132 are connected to one lateral pipe 134. The water supply valve 152 and the water pressure sensor 153 are provided to each of the plurality of drip pipes 132.

Figure 15:
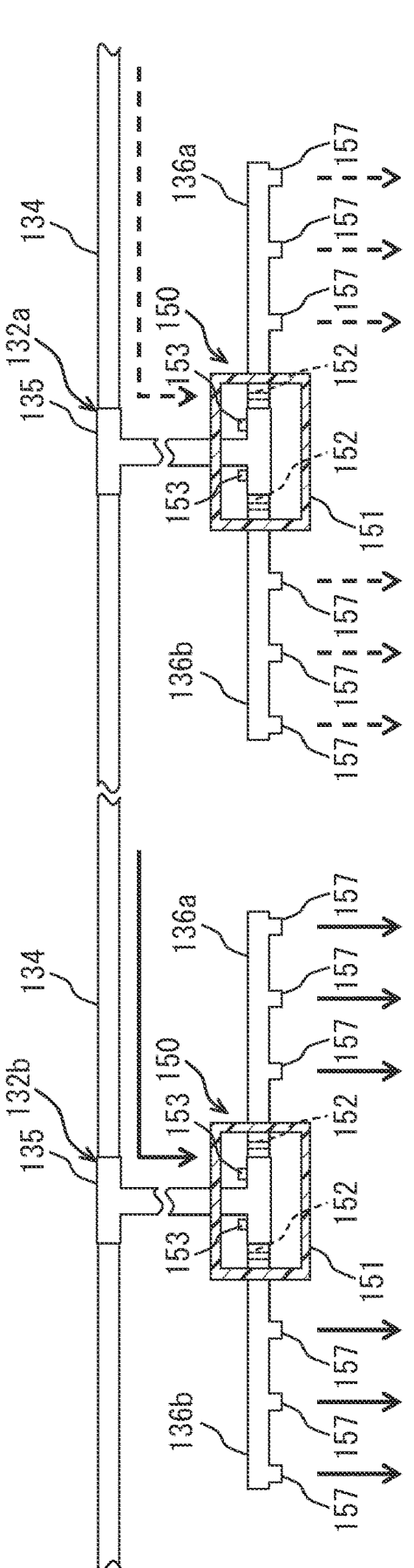
FIG. 15 is a side view illustrating supply and no supply of irrigation water from a drip pipe.

Hereinafter, to simplify the description, as illustrated in FIG. 15, any two of the plurality of drip pipes 132 connected to one lateral pipe 134 are referred to as a first drip pipe 132a and a second drip pipe 132b.

For example, when the water supply valve 152 provided to the first drip pipe 132a becomes the closed state and the water supply valve 152 provided to the second drip pipe 132b becomes the open state, the water pressure on the second drip pipe 132b side decreases more than the water pressure on the first drip pipe 132a side. From the second drip pipe 132b, irrigation water is discharged from the drip holes 137 at a flow velocity corresponding to the water pressure difference between the first drip pipe 132a side and the second drip pipe 132b side.

This water pressure difference and the flow velocity of the irrigation water discharged from the drip holes 137 are in a proportional relationship. When the water pressure difference is denoted by $\Delta P$ and the flow velocity is denoted by v, $\Delta P = k \times v \times v$ is satisfied. Here, k is a prescribed value determined by the diameter of the water supply pipe 130 or the like, and is stored in the information storage unit 500. Therefore, the flow velocity v of the irrigation water can be calculated by detecting the pressure difference $\Delta P$.

The flow velocity v corresponds to the supply amount (discharge amount) of irrigation water per unit time. Therefore, by calculating the time integrated value of the flow velocity v expressed by the above equation, the amount of irrigation water discharged from the drip holes 137 can be calculated. In this manner, the supply amount of irrigation water can be calculated based on the output of the water pressure sensor 153.

Note that irrigation water is supplied to the plants 30 when the amount of light is large under fine weather or the like, rather than when the amount of light is small under a rainy weather or the like. Under such a condition, the power storage amount of the power storage unit 362 is likely to increase. Accordingly, the intermittent driving interval of the microcomputer 330 is short. Thus, the interval at which the microcomputer 330 executes the sensor processing described based on FIG. 6 is short. As a result, the interval of acquiring the water pressure detected by the water pressure sensor 153 at the time of supplying irrigation water is short. This water pressure is successively stored in the information storage unit 500.

The integrated calculation unit 600 reads the water pressure and a prescribed value k stored in the information storage unit 500. The integrated calculation unit 600 calculates the flow velocity v based on the above equation. The integrated calculation unit 600 calculates the flow velocity v at the intermittent driving interval of the microcomputer 330 until the water supply valve 152 is transitioned from the closed state to the open state. The integrated calculation unit 600 adds up all the flow velocities v in this period. In this way, the integrated calculation unit 600 calculates the time integrated value of the flow velocities v. Thus, the integrated calculation unit 600 calculates the supply amount of irrigation water for each divided area.

When irrigation water is supplied from each of the plurality of drip pipes 132 connected to one lateral pipe 134, for example, irrigation water is discharged with the water supply valves 152 of some of the plurality of drip pipes 132 being in the open state. Thereafter, irrigation water is discharged with the remaining water supply valves 152 being in the open state.

Thus, the plurality of drip pipes 132 connected to one lateral pipe 134 are not uniformly controlled from the closed state to the open state, but partially changed from the closed state to the open state in a time division manner. This makes it possible to detect the pressure difference expressed by the above equation. As a result, it is possible to calculate the amount of irrigation water supplied.

Second Embodiment

The present disclosure relates to a communication device.

As disclosed in JP2017-009305A, a sensing device including a communication processing unit that transmits sensing data to a base station has been known.

In the configuration described in the above publication, the communication processing unit and the base station perform wireless communications. For example, when noise is mixed in the wireless communications, reliability of information transmitted between the communication processing unit and the base station is compromised.

An object of the present disclosure is to provide a communication device capable of determining whether information is highly reliable.

With a communication device according to an aspect of the present disclosure, radio signals transmitted between a plurality of communication units 340, 400 provided to an open farm field 20 in which a plant 30 grows include a plurality of different types of data 343, 344, 345 as well as a plurality of pieces of at least one type of data of the plurality of different types of data, and the plurality of different types of data are in a predetermined arrangement in the radio signals.

With this configuration, whether the reliability of the radio signal is high can be determined based on whether the plurality of pieces of data of the same type arranged at predetermined positions in the radio signal are equal.

A second embodiment will be described below based on FIG. 16 to FIG. 18.

As described above, a time interval during which the radio signal is sent and received between the communication unit 340 and the integrated communication unit 400 is long. Thus, a large amount of data can be included in the data 342 for a single wireless communication. Therefore, a plurality of pieces of the same data and various pieces of security information can be included in the data 342 in order to improve reliability of the information.

Figures 16, 17, 18:
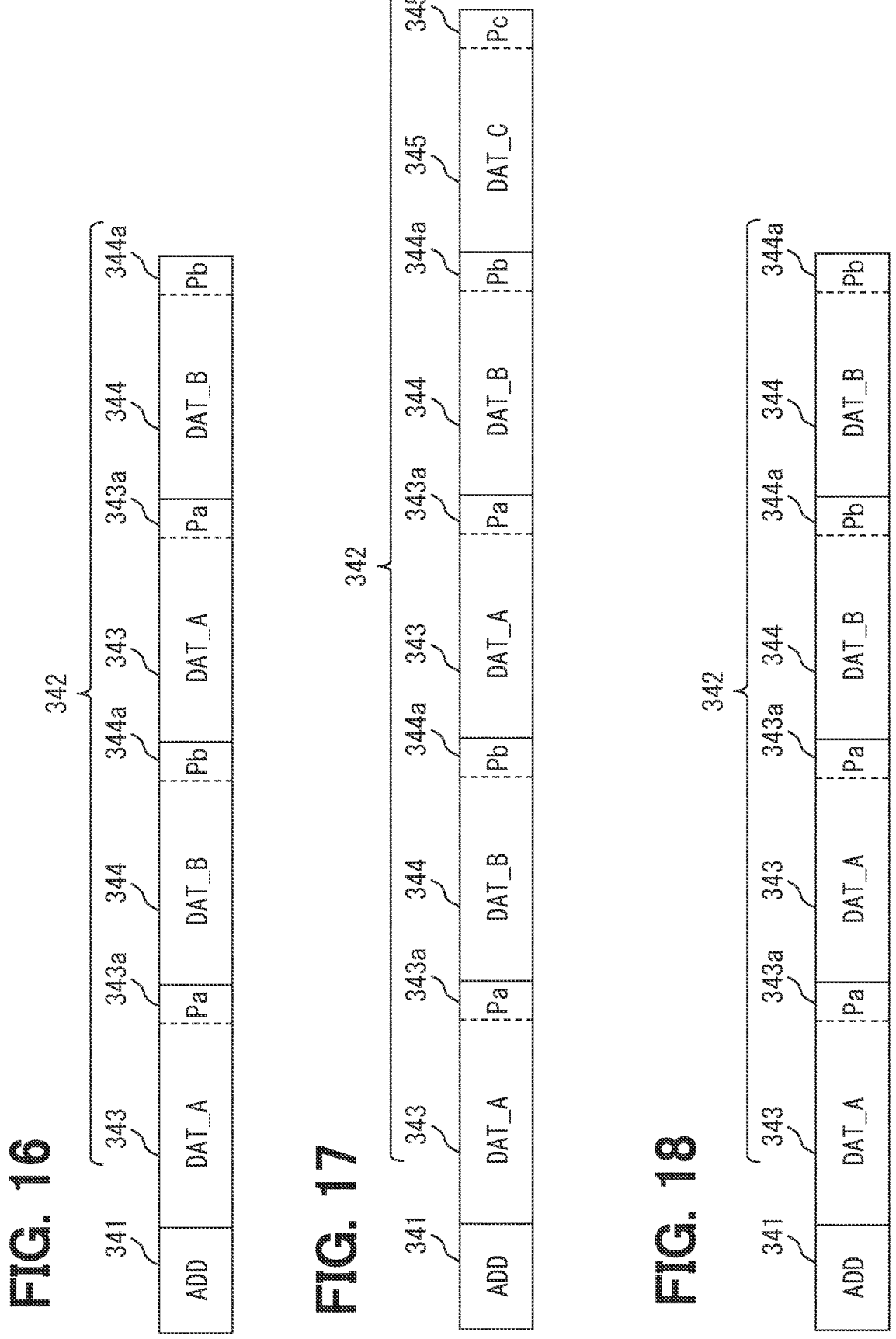
FIG. 16 is a schematic diagram illustrating a radio signal.
FIG. 17 is a schematic diagram illustrating a radio signal.
FIG. 18 is a schematic diagram illustrating a radio signal.

For example, as illustrated in FIG. 16, two pieces of the same first data 343 may be included in the data 342. Two pieces of the same second data 344 may be included in the data 342. Then, as illustrated in FIG. 16, the first data 343 and the second data 344 may be alternately arranged in a radio signal.

Furthermore, a first parity bit 343a indicating whether the total number of 0 and 1 included in the first data 343 is an odd number or an even number may be attached to the first data 343. A second parity bit 344a indicating whether the total number of 0 and 1 included in the second data 344 is an odd number or an even number may be attached to the second data 344.

In the drawing, the first data 343 is denoted as DAT_A, and the second data 344 is denoted as DAT_B. The first parity bit 343a is denoted as Pa, and the second parity bit 344a is denoted as Pb.

With such a configuration, in accordance with the example illustrated in FIG. 16, information included next to the address 341 is expected to be the first data 343, and information included next but one to the first data 343 is also expected to be the first data 343. Whether the data 342 is correct can be determined based on whether the first parity bits 343a attached to these two pieces of first data 343 are equal. Alternatively, whether the data 342 is correct can be determined based on whether the two pieces of first data 343 are equal.

In the same manner, information included next but one to the address 341 is expected to be the second data 344, and information included next but one to the second data 344 is also expected to be the second data 344. Whether the data 342 is correct can be determined based on whether the second parity bits 344a attached to these two pieces of second data 344 are equal. Alternatively, whether the data 342 is correct can be determined based on whether the two pieces of second data 344 are equal.

Operations and Effects

As described above, a plurality of pieces of the same type of data are included in a single wireless communication. Then, the pieces of the same type of data, which are expected to be equal, are compared with each other. In this manner, whether the data 342 included in the radio signal is correct can be determined.

As described above, a parity bit indicating whether the total number of 0 and 1 included in the same type of data is an odd number or an even number is attached to each of the same type of data. Then, parity bits included in the pieces of the same type of data, which are expected to be equal, are compared with each other. In this manner, whether the data 342 included in the radio signal is correct can be easily determined.

In the example described in the present embodiment, two pieces of each of the first data 343 and the second data 344 of different types are included in the radio signal. However, the types of data included in the radio signal are not limited to two types, and may be three or more types. The number of pieces of the same type of data included in the radio signal is not limited to two, and may be three or more.

In the example described in the present embodiment, a plurality of pieces of data of the same type are included in the radio signal. Alternatively, for example, as illustrated in FIG. 17, a configuration may be employed in which the first data 343 to third data 345 of different types are included in the radio signal. A configuration may be employed in which not a plurality of, but one piece of third data 345 is included in the radio signal. A third parity bit 345a may be attached to the third data 345. In the drawing, the third data 345 is denoted as DAT_C, and the third parity bit is denoted as Pc.

In the example described in the present embodiment, two different types of data are alternately arranged in the radio signal. However, the pattern in which different types of data are arranged in the radio signal is not limited to the above example. For example, as illustrated in FIG. 18, a configuration may be employed in which pieces of the same type of data are continuously arranged.

The irrigation system 10 described in the present embodiment includes at least one of the components of the irrigation system 10 described in the first embodiment. Therefore, it is a matter of course that the irrigation system 10 of the present embodiment performs and provides the operations and effects described in the first embodiment using the same components as those of the irrigation system 10 described in the first embodiment. Therefore, the description thereof is omitted. In other embodiments described below, description of the same operations and effects is omitted.

Third Embodiment

The present disclosure relates to a monitoring unit that monitors an environment of a farm field.

As disclosed in JP-5830411B, a wireless management system including a plurality of secondary stations arranged in remote farm fields and one primary station has been known.

The secondary stations described in the above publication each include a CPU and a sensor. The secondary stations are provided in the farm fields, and, for example, wiring connecting the CPU and the sensor may be damaged by harmful animals appearing in the farm fields.

An object of the present disclosure is to provide a monitoring unit with which inhibition of exchange of electrical information caused by harmful animals is suppressed.

A monitoring unit according to an aspect of the present disclosure is a monitoring unit that is provided to each of a plurality of divided areas obtained by dividing an open farm field 20 in which a plant 30 grows, and monitors an environment of the divided area and performs wireless communications with an integrated communication unit 400 provided in the farm field, the monitoring unit comprising:

a first monitoring unit 300a partially provided in a soil of the divided area; and a second monitoring unit 300b that is provided more on a sky side of the divided area than the first monitoring unit, and is configured to perform wireless communications with the first monitoring unit and wireless communications with the integrated communication unit.

With this configuration, inhibition of exchange of electrical information between the first monitoring unit 300a and the second monitoring unit 300b caused by harmful animals is suppressed.

A third embodiment will be described below based on FIG. 19 and FIG. 20.

As described above, the monitoring unit 300 is provided on the sky side of the farm field 20 in order to generate power by the solar cell 361. On the other hand, the soil moisture sensor 311 is provided on the ground of the farm field 20 in order to detect soil moisture content. Therefore, the monitoring unit 300 and the soil moisture sensor 311 are separated from each other in the z direction.

The monitoring unit 300 and the soil moisture sensor 311 are electrically connected via, for example, the wire 160 illustrated in FIG. 1. The wire 160 connecting the monitoring unit 300 and the soil moisture sensor 311 may be damaged by harmful animal such as wild boars or deer.

Figure 19:
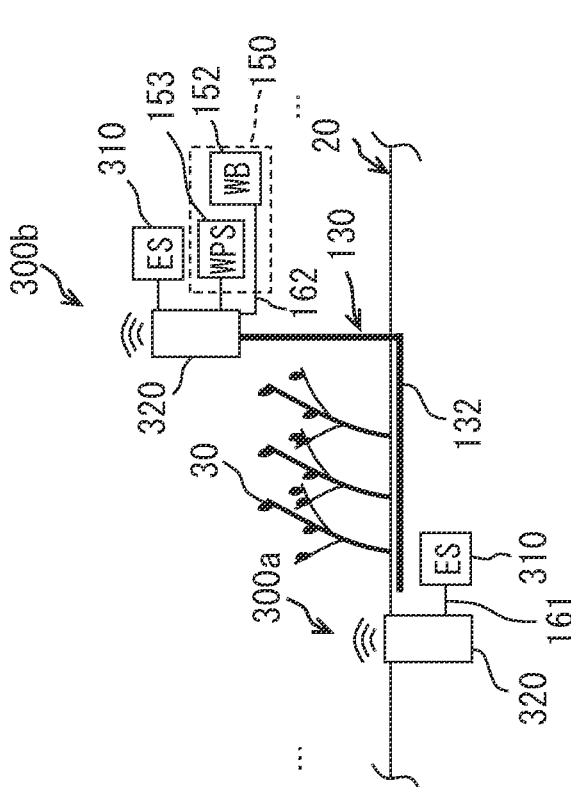
FIG. 19 is a cross-sectional view illustrating the irrigation system.
Figure 20:
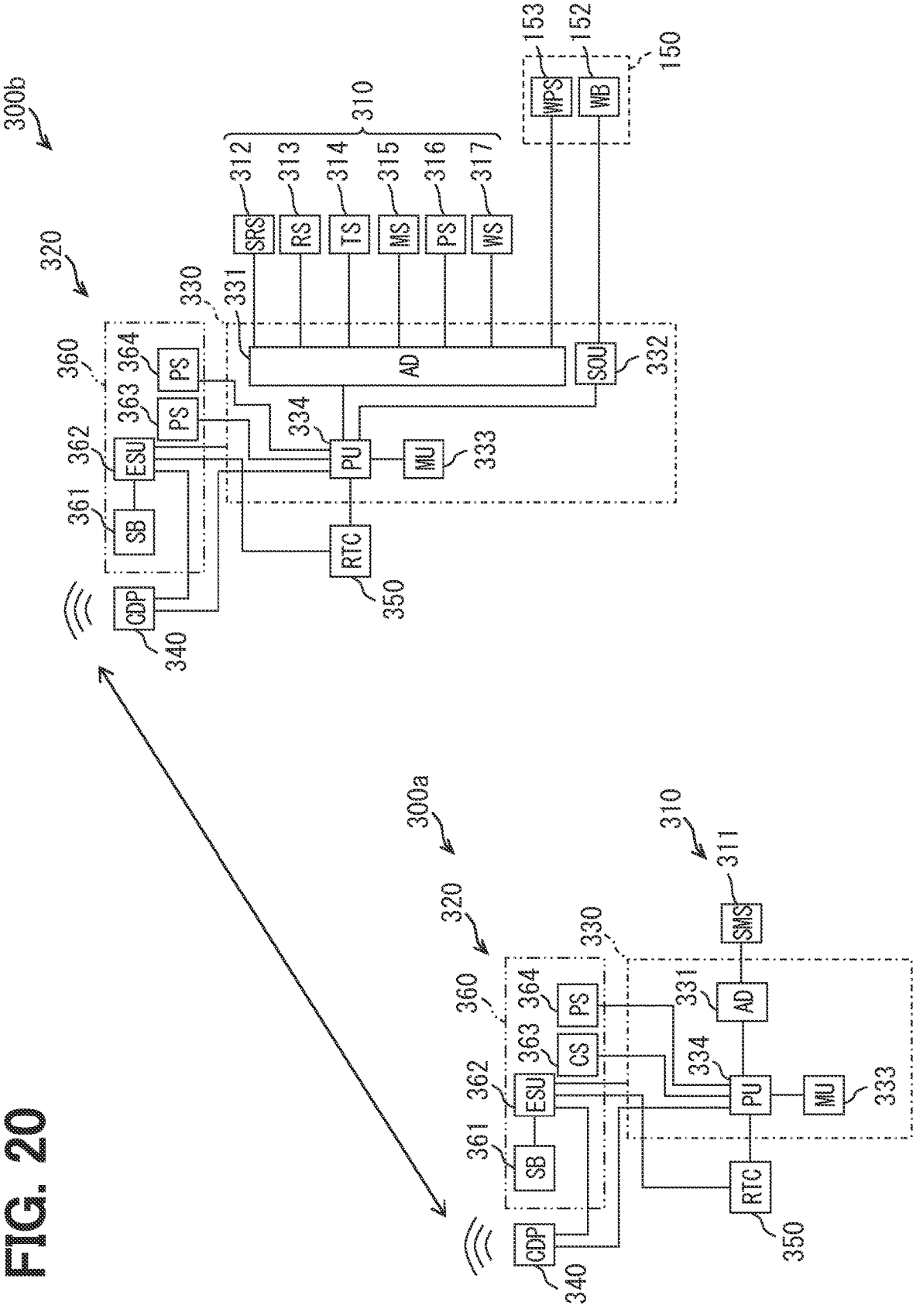
FIG. 20 is a block diagram illustrating a first monitoring unit and a second monitoring unit.

To address this, the monitoring unit 300 of the present embodiment includes a first monitoring unit 300a and a second monitoring unit 300b illustrated in FIGS. 19 and 20. The first monitoring unit 300a is provided on the ground side of one divided area, and the second monitoring unit 300b is provided on the sky side of this divided area.

<First Monitoring Unit>

As illustrated in FIG. 20, the first monitoring unit 300a includes the soil moisture sensor 311 as the environment sensor 310. The first monitoring unit 300a is buried in the ground together with the soil moisture sensor 311. A part of the first monitoring unit 300a is exposed from the ground so as not to hinder power generation by the solar cell 361 and wireless communication by the communication unit 340. The solar cell 361 of the first monitoring unit 300a is separated from the plants 30 in directions along the ground, so that the incidence of sunlight is not blocked by the branches and leaves of the grown plants 30. The environment sensor 310 of the first monitoring unit 300a may include the solar radiation sensor 312.

The first monitoring unit 300a executes a part of the various types of processing described above. The first monitoring unit 300a acquires the output of the soil moisture sensor 311, for example, in the sensor processing described based on FIG. 6. Then, the first monitoring unit 300a transmits a sensor signal to the second monitoring unit 300b by wireless communications.

<Second Monitoring Unit>

As illustrated in FIG. 20, the second monitoring unit 300b includes the solar radiation sensor 312 as the environment sensor 310. The water pressure sensor 153 and the water supply valve 152 are connected to the second monitoring unit 300b. At least one of environment sensors 310 of the plurality of second monitoring units 300b provided to the farm field 20 includes the rain sensor 313, the temperature sensor 314, the humidity sensor 315, the atmospheric pressure sensor 316, and the wind sensor 317.

The second monitoring unit 300b executes the various types of processing described above. The processing load on the second monitoring unit 300b is larger than that on the first monitoring unit 300a.

The second monitoring unit 300b acquires sensor signals of the environment sensor 310 and the water pressure sensor 153 input thereto, for example, in the sensor processing described based on FIG. 6. At the same time, the second monitoring unit 300b acquires the output of the soil moisture sensor 311 output from the first monitoring unit 300a. The second monitoring unit 300b outputs a radio signal including these sensor signals to the integrated communication unit 400.

When the intermittent driving interval is input from the integrated communication unit 400, the second monitoring unit 300b updates the wake-up interval for outputting the wake-up signal from its RTC 350, and outputs a radio signal including the intermittent driving interval to the first monitoring unit 300a. The first monitoring unit 300a updates the wake-up interval for outputting the wake-up signal from its RTC 350 based on the input intermittent driving interval.

Operations and Effects

As described above, the first monitoring unit 300a is provided on the ground side of one divided area, and the second monitoring unit 300b is provided on the sky side of this area. Then, these perform wireless communications. Thus, inhibition of exchange of electrical information between the first monitoring unit 300a and the second monitoring unit 300b caused by harmful animals is suppressed.

Note that, for example, as illustrated in FIG. 19, since the first monitoring unit 300a is provided on the ground side, a part thereof is likely to be covered by the plants 30. As a result, the power generation amount in the first monitoring unit 300a tends to be reduced.

In view of this, the processing load on the first monitoring unit 300a set to be smaller than that on the second monitoring unit 300b. As a result, depletion of electric power in the first monitoring unit 300a is suppressed.

As illustrated in FIG. 19, wiring 161 connecting the first monitoring unit 300a and the soil moisture sensor 311 is buried in the soil. Thus, damage to this wiring 161 caused by harmful animals is suppressed.

As illustrated in FIG. 19, the second monitoring unit 300*b* is provided more on the sky side than the plants 30 fully grown are. In the present embodiment, the second monitoring unit 300*b* is provided higher on the sky side than the heights of harmful animals assumed to appear in the farm field 20. Wiring 162 connecting each of the environment sensor 310, the water pressure sensor 153, and the water supply valves 152 and the second monitoring unit 300*b* is also provided higher on the sky side than the heights of the harmful animals. Thus, damage to the wiring 162 caused by the harmful animals is suppressed. With any wiring connected to the second monitoring unit 300*b* provided higher on the sky side than the heights of the harmful animals in this manner, damage to the wiring caused by the harmful animals is suppressed. The wiring 162 corresponds to the connection wiring.

To provide the second monitoring unit 300*b* provided higher on the sky side than the plants 30 fully grown are, for example, as schematically illustrated in FIG. 19, a part of the water supply pipe 130 extends from the ground toward the sky side, is folded back, and extends from the sky side to the ground side. The second monitoring unit 300*b* may be provided at a portion of the water supply pipe 130 located on the sky side.

As illustrated in FIG. 19, in the present embodiment, the drip pipe 132 is buried in the soil. Thus, damage to the drip pipe 132 caused by the harmful animals is suppressed. Leakage of irrigation water in the drip pipe 132 due to the damage to the drip pipe 132 caused by the harmful animals is suppressed.

Figure 21:
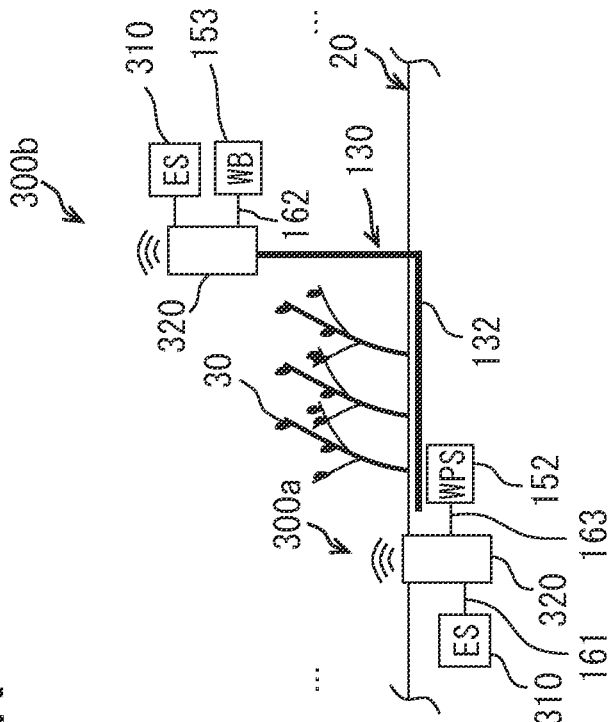
FIG. 21 is a cross-sectional view illustrating a modification of the irrigation system.
Figure 22:
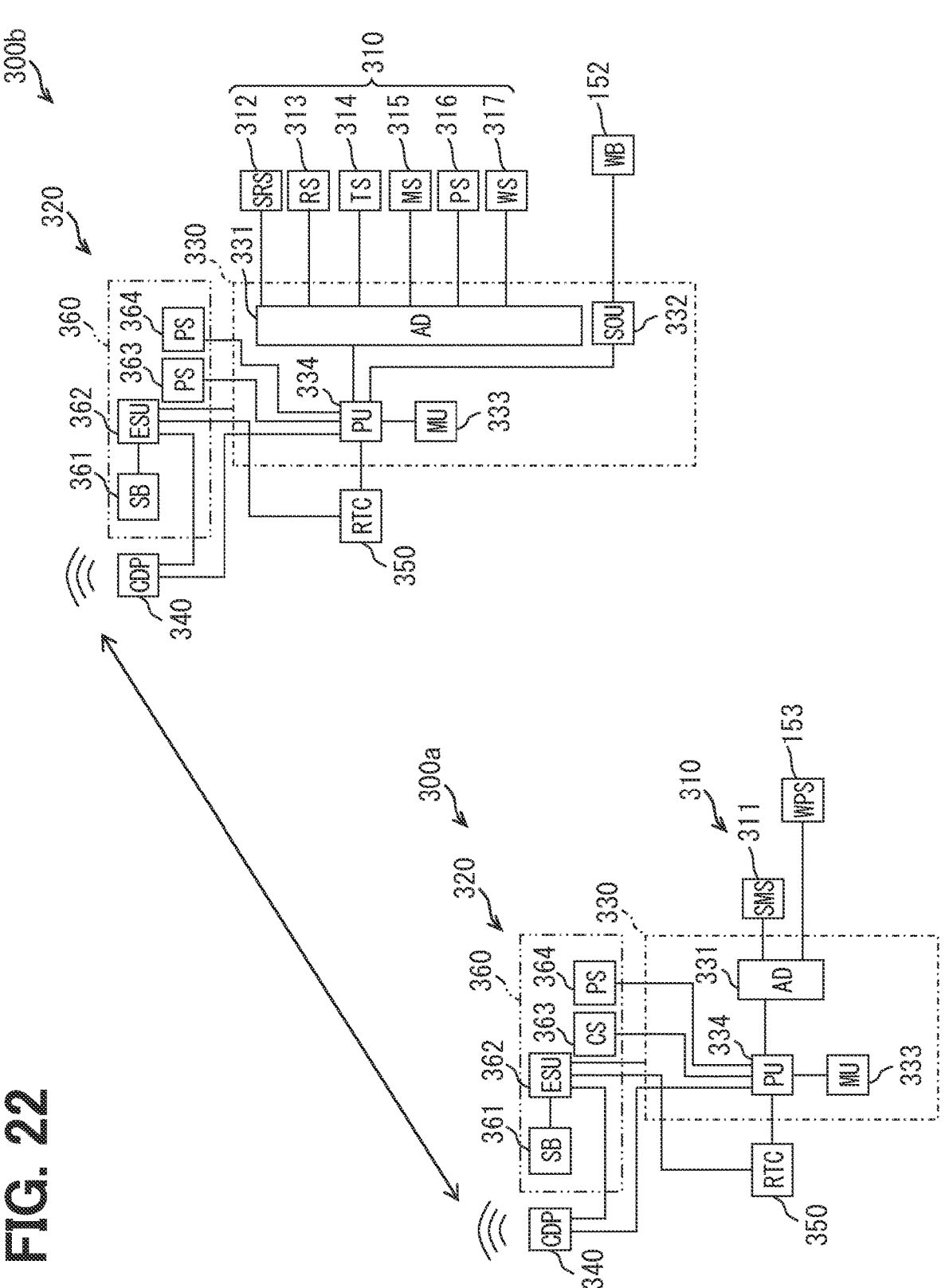
FIG. 22 is a block diagram illustrating a first monitoring unit and a second monitoring unit.

In the example described in the present embodiment, the water pressure sensor 153 is connected to the second monitoring unit 300*b*. Alternatively, for example, as illustrated in FIGS. 21 and 22, a configuration may be employed in which the water pressure sensor 153 is connected to the first monitoring unit 300*a*.

In the case of this modification, the water pressure sensor 153 is buried in the soil. Wiring 163 connecting the water pressure sensor 153 and the first monitoring unit 300*a* is also buried in the soil. Thus, damage to this wiring 163 caused by the harmful animals is suppressed. With any wiring connected to the first monitoring unit 300*a* buried in the soil in this manner, damage to the wiring caused by the harmful animals is suppressed.

In the example described in the present embodiment, the first monitoring unit 300*a* is provided on the ground side of one divided area, and the second monitoring unit 300*b* is provided on the sky side of this divided area. Alternatively, a configuration may be employed in which a plurality of first monitoring units 300*a* are provided on the ground side of each of a plurality of divided areas, and one second monitoring unit 300*b* common to the plurality of first monitoring units 300*a* is provided on the sky side of the farm field 20.

The total number of the first monitoring units 300*a* and the total number of the second monitoring units 300*b* included in the plurality of monitoring units 300 may be equal or different. The total number of the second monitoring units 300*b* may be smaller than the total number of the first monitoring units 300*a* included in the plurality of monitoring units 300. A ratio of the total number of the first monitoring units 300*a* and the total number of the second monitoring units 300*b* included in the plurality of monitoring units 300 may be 1:1 or 2:1, for example.

<Depth of Drip Pipe>

The drip pipe 132 may be buried, for example, to the depth of the boundary between the soil layer and the layer lower than the soil layer. Then, the openings of the drip holes 137 of the drip pipe 132 may be oriented toward the ground surface in the soil or oriented in the horizontal direction.

Thus, for example, when the plants 30 are dug out from the surface layer side of the soil layer by a cultivator or the like, damage to the drip pipe 132 caused by the cultivator is suppressed. Furthermore, the supply of irrigation water from the drip pipe 132 to the soil layer, in which the plants 30 are cultivated, is achieved by a capillary phenomenon or the like.

<Pole>

Although not illustrated, a dedicated pole for providing the second monitoring unit 300*b* on the sky side may be provided in the farm field 20. The length (height) of this pole in the z direction may be variable. Furthermore, to increase the power generation efficiency, the distal end side of the pole provided with the second monitoring unit 300*b* may rotate in the circumferential direction around its axial direction according to the position of the sun. The position of the sun can be detected based on the current time, the solar radiation amount detected by the solar radiation sensor 312, and the like.

<Repulsing Device>

As described above, a part of the irrigation system 10 may be damaged by the harmful animals appearing in the farm field 20. In addition, the plants 30 growing in the farm field 20 may be damaged by the harmful animals.

To address these, each of the plurality of monitoring units 300 may include a detection device for detecting harmful animals and a repulsing device for repelling harmful animals. As a method for detecting harmful animals, imaging with a camera may be employed. As a method for repelling harmful animals, it is conceivable to stimulate at least one of the five senses of wild boars, deer, crows, or other birds and animals assumed to appear in the farm field 20.

The repulsing device includes, for example, at least one of the following components. A light emitting device that emits blinking light or the like for stimulating the vision of birds and animals. A speaker that generates voices of natural enemies or the like for stimulating the hearing of birds and animals. An ultrasonic wave generating device that generates ultrasonic waves for stimulating the tactile sense of birds and animals. An odor generating device for generating an odor of ions or the like for stimulating the olfactory sense of birds and animals. A spraying device for spraying a liquid that is harmless to the plants 30 to the farm field 20 and stimulates the taste of birds and animals.

Fourth Embodiment

The present disclosure relates to a monitoring unit that monitors an environment of a farm field.

As disclosed in JP-5830411B, a wireless management system including a plurality of secondary stations arranged in remote farm fields and one primary station has been known.

The secondary stations described in the above publication each include a CPU and a sensor. The secondary stations are provided in the farm fields, and, for example, wiring connecting the CPU and the sensor may be damaged by harmful animals appearing in the farm fields.

An object of the present disclosure is to provide a monitoring unit with which inhibition of exchange of electrical information caused by harmful animals is suppressed.

A monitoring unit according to an aspect of the present disclosure is a monitoring unit provided to each of a plurality of divided areas obtained by dividing an open farm field 20 in which a plant 30 grows, together with a water supply pipe 130, and includes:

a first electrical device 320;

a second electrical device 152, 153;

a connector 157 configured to electrically connect the first electrical device and the second electrical device to each other; and an integrated case 154 including a body 155 having a storage space in which the first electrical device and the second electrical device are stored, and a partition wall 156 that cooperates with the connector to divide the storage space into a first storage space in which the first electrical device is stored and a second storage space in which the second electrical device is stored.

With this configuration, inhibition of exchange of electrical information between the first electrical device 320 and the second electrical device 152, 153 caused by harmful animals is suppressed.

Figure 23:
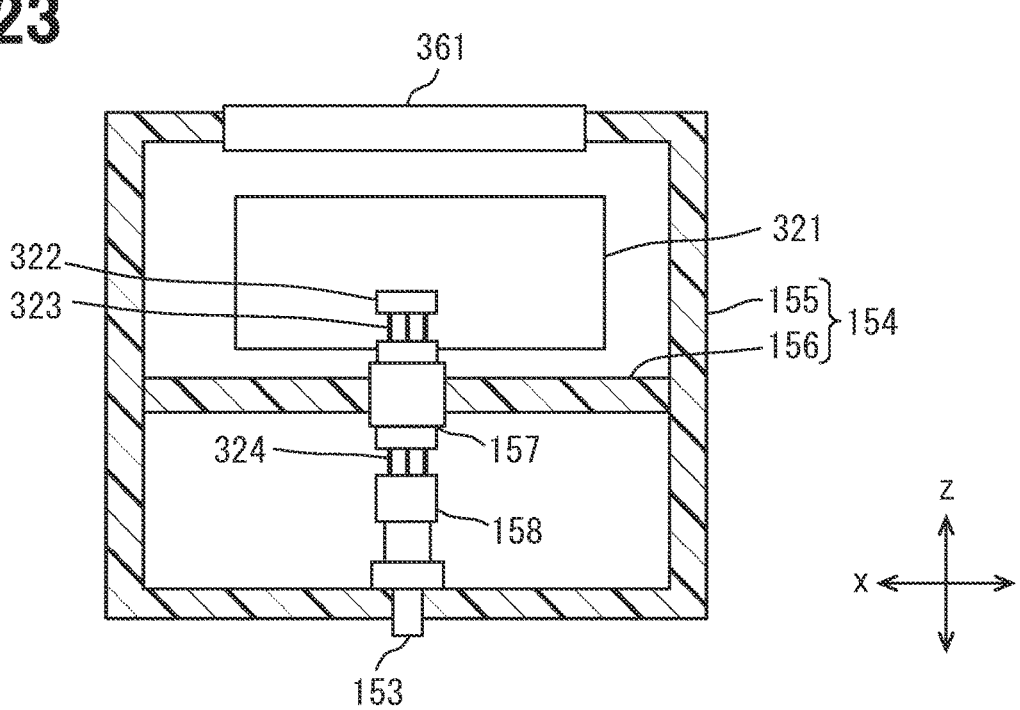
FIG. 23 is a cross-sectional view illustrating an integrated case.

A fourth embodiment will be described below based on FIG. 23.

In the present embodiment, at least a part of the piping module 150 is included not in the water supply device 100 but in the control device 200. At least a part of the piping module 150 is included in the monitoring unit 300. As illustrated in FIG. 23, some of the components of each of the monitoring unit 300 and the piping module 150 described above are stored in an integrated case 154. Such a configuration can be applied to, for example, the second monitoring unit 300b described in the third embodiment. FIG. 23 illustrates the integrated case 154 in cross section.

<Integrated Case>

The integrated case 154 has a first storage space and a second storage space. The components of the monitoring unit 300 are stored in the first storage space. The components of the piping module 150 are stored in the second storage space. Among the components of the monitoring unit 300, the components stored in the first storage space correspond to the first electrical device. Among the components of the piping module 150, the components stored in the second storage space correspond to the second electrical device.

The integrated case 154 includes a box-shaped body 155 and a partition wall 156 that divides the hollow space of the body 155 into two. The partition wall 156 and a connector 157 described below divide the hollow space of the body 155 into the first storage space and the second storage space described above.

The partition wall 156 is provided with the connector 157 for electrically connecting the member stored in the first storage space and the member stored in the second storage space. A central portion of this connector 157 is connected to the partition wall 156 by insert molding. Thus, one end side of the connector 157 is provided in the first storage space. At the same time, the other end side of the connector 157 is provided in the second storage space.

<First Storage Space>

The first storage space stores the control unit 320 of the monitoring unit 300. Each of the microcomputer 330, the communication unit 340, and the RTC 350 included in the control unit 320 is mounted on a wiring board 321. The power storage unit 362, the current sensor 363, and the power sensor 364 included in the power generation unit 360 are also mounted on the wiring board 321. In FIG. 23, only the wiring board 321 out of these components is illustrated.

The solar cell 361 of the power generation unit 360 is provided on the top wall on the sky side of the integrated case 154. An opening is formed in the top wall. The solar cell

361 is fixed to the top wall so as to close this opening. A minute gap between the solar cell 361 and the wall surface defining the opening is closed by a sealing material (not illustrated). Sunlight is incident on a portion of the solar cell 361 located outside the integrated case 154.

With the top wall having translucency, the solar cell 361 is arranged to face the top wall in the z direction in the first storage space. Thus, sunlight is incident on the solar cell 361 through the top wall.

The first storage space may or may not include the environment sensors 310 included in the monitoring unit 300. Examples of the environment sensors 310 that can be stored in the first storage space include the solar radiation sensor 312, the rain sensor 313, the temperature sensor 314, the humidity sensor 315, and the atmospheric pressure sensor 316. The soil moisture sensor 311 and the wind sensor 317 are provided outside the integrated case 154.

<Second Storage Space>

The second storage space stores at least one of the water supply valve 152 and the water pressure sensor 153 of the piping module 150.

In the present embodiment, a part of the water pressure sensor 153 is provided in the second storage space. A portion of the water pressure sensor 153 located outside the second storage space is provided in the water supply pipe 130.

As described above, the second storage space is provided on the water supply pipe 130 side. For this reason, the second storage space tends to have higher humidity than the first storage space because of water droplets or the like due to dew condensation on the outer surface of the water supply pipe 130, through which irrigation water flows.

In the configuration in which the water supply valve 152 is provided in the second storage space, a part of the second storage space is occupied by the water supply pipe 130. For this reason, the second storage space tends to have high humidity because of water droplets or the like due to dew condensation on the outer surface of the water supply pipe 130.

The partition wall 156 and the connector 157 are provided between the first storage space and the second storage space. The partition wall 156 and the connector 157 block flow of air between the first storage space side and the second storage space side.

As described above, one end of the connector 157 is provided in the first storage space. The wiring board 321 provided in the first storage space is provided with a wiring connector 322. One end of the connector 157 and the wiring connector 322 are electrically connected to each other via a first wire harness 323.

The other end of the connector 157 is provided in the second storage space. A portion of the water pressure sensor 153 provided in the second storage space is provided with a sensor connector 158. The other end of the connector 157 and the sensor connector 158 are electrically connected to each other via a second wire harness 324.

With the connection configuration described above, the wiring board 321 provided in the first storage space and the water pressure sensor 153 provided in the second storage space are electrically connected to each other. The components electrically connecting the both to each other are stored in the integrated case 154.

Operations and Effects

As described above, flow of air between the first storage space storing the control unit 320 of the monitoring unit 300 and the second storage space provided with the water pressure sensor 153 of the piping module 150 is blocked by the partition wall 156 and the connector 157. At the same time, the control unit 320 and the water pressure sensor 153 are electrically connected to each other via the connector 157.

In this manner, the components electrically connecting the monitoring unit 300 and the piping module 150 to each other are stored in the integrated case 154. Thus, the electrical connection between the monitoring unit 300 and the piping module 150 is prevented from being impaired by harmful animals.

With the above configuration, a decrease in the service life of control unit 320 stored in the first storage space due to the moisture contained in the air in the second storage space is suppressed. Furthermore, occurrence of dew condensation in the control unit 320 is suppressed. Therefore, a short circuiting, due to the dew condensation, in the wiring board 321 on which some of the components of the control unit 320 are mounted or the like is suppressed.

The components of the monitoring unit 300 and the piping module 150 are collectively stored in the integrated case 154. Thus, the configuration of the irrigation system 10 is simplified. Furthermore, the monitoring unit 300 and the piping module 150 do not need to be individually provided to the farm field 20. Thus, the arrangement of the irrigation system 10 in the farm field 20 is simplified.

<Nonwoven Fabric>

Figure 24:
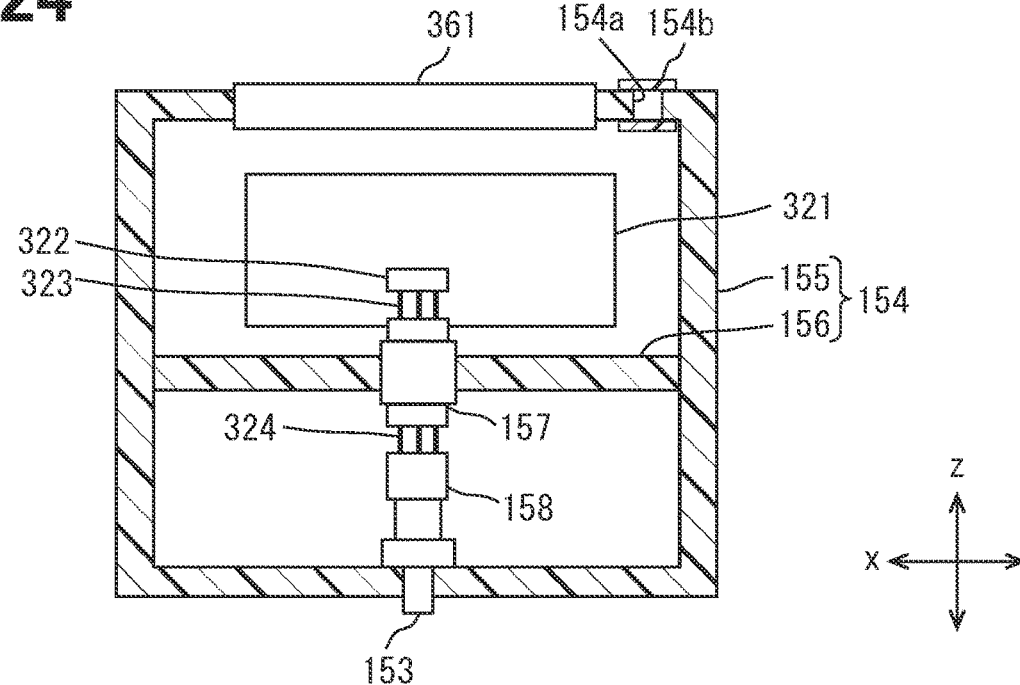
FIG. 24 is a cross-sectional view illustrating a modification of the integrated case.

In the example described in the present embodiment, the second storage space is a sealed space. Alternatively, a configuration may be employed in which a through hole 154a is formed in a top wall of the integrated case 154 forming part of the first storage space as illustrated in FIG. 24 for example. This enables communication between the first storage space and the outer atmosphere. The environment value such as the temperature and humidity of the air in the first storage space is prevented from deviating from the environment value of the air in the divided area.

Still, raindrops or the like may enter the first storage space through the through hole 154a. In order to avoid this, for example, as illustrated in FIG. 24, a nonwoven fabric 154b through which air passes but liquid such as water does not pass is provided on the top wall. The nonwoven fabric 154b covers at least one of the openings of the through hole 154a respectively formed in the outer surface and the inner surface of the top wall. As a result, the flow of air between the first storage space and the outer atmosphere is guaranteed through the through hole 154a, while suppressing entrance of foreign matters such as water droplets and dust into the first storage space through the through hole 154a.

Figure 25:
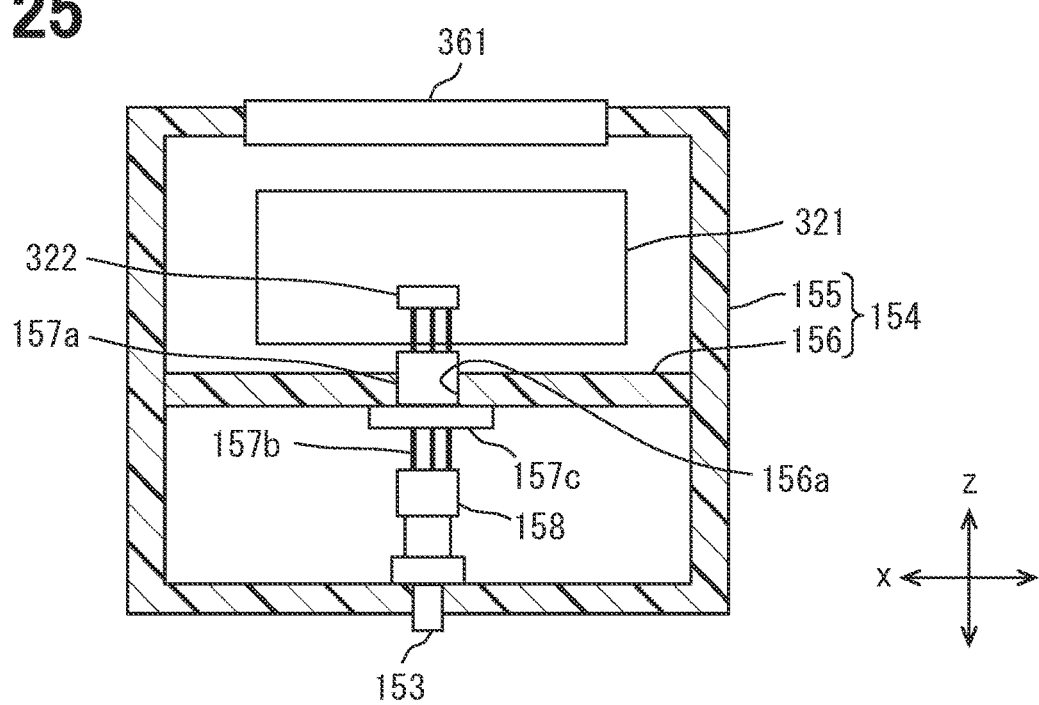
FIG. 25 is a cross-sectional view illustrating a modification of the integrated case.

In the example described in the present embodiment, the central portion of the connector 157 is insert molded on the partition wall 156. Alternatively, a configuration as illustrated in FIG. 25 for example may be employed in which an arrangement hole 156a is formed in the partition wall 156 through a first side surface on the first storage space side and a second side surface on the second storage space side.

In this modification, the connector 157 is provided in the arrangement hole 156a. Specifically, a gasket 157a is provided in the arrangement hole 156a. The gasket 157a is press-fitted into, for example, the arrangement hole 156a. As a result, the outer wall surface of the gasket 157a and a defining surface that defines the arrangement hole 156a are in close contact with each other.

A hole extending in the z direction is formed in the gasket 157a. A wire harness 157b extending between the first storage space and the second storage space is provided in the hole of the gasket 157a.

In such a configuration, the wire harness 157b occupies part of the hollow space of the gasket 157a. The first storage space and the second storage space communicate with each other through a space not occupied by the wire harness 157b in the hollow space. In order to prevent the flow of air between the two storage spaces, a sealing material 157c occupies part of the space in the hole of the gasket 157a on the side of the second side surface of the partition wall 156. As a material for forming the sealing material 157c, for example, rubber, a gel-like insulating member, or the like can be adopted.

Figure 26:
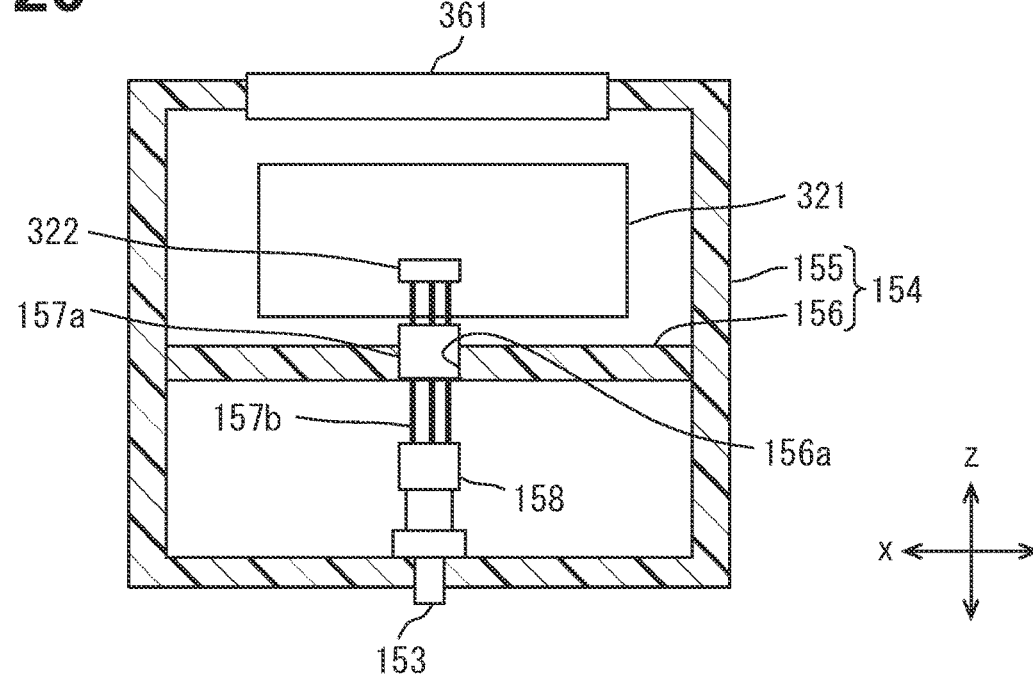
FIG. 26 is a cross-sectional view illustrating a modification of the integrated case.

Note that a moisture-proof agent may be sprayed onto the wiring board 321 stored in the first storage space to make the wiring board 321 highly resistant to humidity. With such a configuration, it is possible to lower the moisture-proof level for preventing the flow of air between the first storage space and the second storage space. In this case, for example, as illustrated in FIG. 26, the sealing material 157c illustrated in FIG. 25 can be omitted. The sealing material 157c is not an essential component.

In the example described in the present embodiment, the first storage space and the second storage space of the integrated case 154 respectively store the components of the monitoring unit 300 and the components of the piping module 150. Alternatively, a configuration may be employed in which the components of the monitoring unit 300 are stored in each of the first storage space and the second storage space.

For example, a configuration may be employed in which the control unit 320 of the monitoring unit 300 is stored in the first storage space, and part of the soil moisture sensor 311 is stored in the second storage space. Such a configuration can be applied to, for example, the first monitoring unit 300a described in the third embodiment.

Other Modifications

In the first embodiment, an example is described in which the lateral pipe 134 is more separated from the ground in the z direction than the apices of the plants 30 fully grown are. Alternatively, the lateral pipe 134 may be located closer to the ground side in the z direction than the apices of the plants 30 fully grown are.

In the first embodiment, an example is described in which each of the lateral pipe 134 and the longitudinal pipe 133 is provided on the sky side of the farm field 20. Alternatively, at least one of the lateral pipe 134 and the longitudinal pipe 133 may be provided on the ground. At least one of the lateral pipe 134 and the longitudinal pipe 133 may be provided in the ground.

Although the present disclosure has been described based on the embodiments, it should be understood that the present disclosure is not limited to the embodiments and structures. The present disclosure also includes various modifications and variations within a range of equivalence. Furthermore, although various combinations and modes are described in the present disclosure, the scope and idea of the present disclosure further include other combinations and modes including only one element, more elements, or less elements in these.

(Technical Ideas)

The present specification includes various technical ideas described below.

<Radio Signal>

[Technical Idea 1]

A communication device, wherein radio signals transmitted between a plurality of communication units 340, 400 provided to an open farm field 20 in which a plant 30 grows include a plurality of different types of data 343, 344, 345 as well as a plurality of pieces of at least one type of data of the plurality of different types of data, and the plurality of different types of data are in a predetermined arrangement in the radio signals.

[Technical Idea 2]

The communication device according to Technical Idea 1, wherein a parity bit 343*a*, 344*a*, 345*a* of each of the plurality of different types of data is attached to each of the plurality of different types of data.

<Inter Monitoring Unit Communication>

[Technical Idea 1]

A monitoring unit that is provided to each of a plurality of divided areas obtained by dividing an open farm field 20 in which a plant 30 grows, and monitors an environment of the divided area and performs wireless communications with an integrated communication unit 400 provided in the farm field, the monitoring unit comprising:

a first monitoring unit 300*a* partially provided in a soil of the divided area; and a second monitoring unit 300*b* that is provided more on a sky side of the divided area than the first monitoring unit is, and is configured to perform wireless communications with the first monitoring unit and wireless communications with the integrated communication unit.

[Technical Idea 2]

The monitoring unit according to Technical Idea 1, wherein each of the first monitoring unit and the second monitoring unit includes a solar cell 361 configured to generate driving power, and the first monitoring unit has a smaller processing load than the second monitoring unit.

[Technical Idea 3]

The monitoring unit according to Technical Idea 2, wherein at least a part of the second monitoring unit is provided more on the sky side of the divided area than apices of the plants fully grown are.

[Technical Idea 4]

The monitoring unit according to any one of Technical Ideas 1 to 3, wherein wiring 161, 163 connected to the first monitoring unit is buried in the soil.

[Technical Idea 5]

The monitoring unit according to any one of Technical Ideas 1 to 4, wherein connection wiring 162 connected to the second monitoring unit is provided higher on the sky side than a height of a harmful animal assumed to appear in the farm field.

[Technical Idea 6]

The monitoring unit according to any one of Technical Ideas 1 to 5, wherein the first monitoring unit includes a soil moisture sensor 311 configured to detect a soil moisture content of the divided area.

[Technical Idea 7]

The monitoring unit according to any one of Technical Ideas 1 to 6, wherein the second monitoring unit controls a water supply valve 152 configured to control supply of irrigation water from a water supply pipe provided in the farm field to the divided areas.

<Integrated Case>

[Technical Idea 1]

A monitoring unit provided to each of a plurality of divided areas obtained by dividing an open farm field 20 in which a plant 30 grows, together with a water supply pipe 130, the monitoring unit comprising:

a first electrical device 320;

a second electrical device 152, 153, 311;

a connector 157 configured to electrically connect the first electrical device and the second electrical device to each other; and an integrated case 154 including a body 155 having a storage space in which the first electrical device and the second electrical device are stored, and a partition wall 156 that cooperates with the connector to divide the storage space into a first storage space in which the first electrical device is stored and a second storage space in which the second electrical device is stored.

[Technical Idea 2]

The monitoring unit according to Technical Idea 1, wherein the body includes a through hole 154*a* through which air flows between the first storage space and an outer atmosphere.

[Technical Idea 3]

The monitoring unit according to Technical Idea 2, comprising a nonwoven fabric 154*b* having a property of allowing air to pass but not allowing liquid to pass, an opening of the through hole is closed by the nonwoven fabric.

[Technical Idea 4]

The monitoring unit according to any one of Technical Ideas 1 to 3, wherein flow of air between the first storage space and the second storage space is blocked by the partition wall and the connector.

[Technical Idea 5]

The monitoring unit according to Technical Idea 4, wherein a part of the connector is insert molded on the partition wall.

[Technical Idea 6]

The monitoring unit according to any one of Technical Ideas 1 to 4, wherein an arrangement hole 156*a* is formed in the partition wall through the first storage space and the second storage space, and the connector is partially provided in the arrangement hole.

[Technical Idea 7]

The monitoring unit according to Technical Idea 6, wherein the connector includes a gasket 157*a* partially provided in the arrangement hole and including a hollow space that communicates the first storage space and the second storage space, and a wire harness 157*b* provided in the hollow space of the gasket.

[Technical Idea 8]

The monitoring unit according to Technical Idea 7, wherein the connector includes, in addition to the gasket and the wire harness, a sealing material 157*c* to prevent air from flowing between the first storage space and the second storage space through a space not occupied by the wire harness in the hollow space of the gasket.

[Technical Idea 9]

The monitoring unit according to any one of Technical Ideas 1 to 8, wherein the first electrical device includes a calculation processing unit 330 configured to execute calculation processing, a communication unit 340 configured to perform wireless communications, and a solar cell 361 configured to convert light energy into electric energy.

[Technical Idea 10]

The monitoring unit according to any one of Technical Ideas 1 to 9, wherein the second electrical device includes at least one of a water supply valve 152 configured to control supply and no supply of irrigation water from the water supply pipe to the farm field, and a water pressure sensor 153 configured to detect water pressure of the irrigation water in the water supply pipe.

What is claimed is:

1. An inspection device configured to inspect a water supply pipe provided in a farm field that is open and in which a plant grows, the inspection device comprising:

an output unit configured to output a control signal to control a water supply valve, which is configured to control supply and no supply of irrigation water from the water supply pipe to the farm field, between an open state and a closed state;

a storage unit configured to store a plurality of water pressures of irrigation water detected by a water pressure sensor in a period from a state where the water supply valve becomes in the open state and where irrigation water is supplied from the water supply pipe to the farm field until an expected time elapses after the water supply valve becomes in the closed state and the water supply pipe is expected to be filled with irrigation water; and an inspection unit configured to:

calculate a time constant of a water pressure, the time constant being based on a change over time in water pressure during a transition period in which the water pressure recovers from a flow pressure to a pump pressure which is higher than the flow pressure, based on a change in the plurality of water pressures of the irrigation water and inspect the water supply pipe based on the time constant, and determine that the water supply pipe and the water supply valve are normal when the time constant that is calculated is higher than an expected time constant, which is determined based on the time constant when the water pressure with no damage occurring recovers from the flow pressure to the pump pressure.

2. The inspection device according to claim 1, further comprising:

a solar cell configured to convert incident light energy into an electric energy, wherein the inspection unit is configured to be driven by an electric power supplied from the solar cell.

3. The inspection device according to claim 1, wherein the inspection unit is configured to calculate the time constant based on the change over time in water pressure during the transition period in which the water pressure recovers from the flow pressure to the pump pressure by the output unit that outputs the control signal to control the water supply valve from the open state to the closed state.

4. The inspection device according to claim 1, wherein the time constant is a speed of the change over time of the water pressure during the transition period in which the water pressure recovers from the flow pressure to the pump pressure, the pump pressure is a detected water pressure, of the plurality of water pressures in the storage unit, in the water supply pipe in a condition that the water supply valve is in the closed state such that irrigation water is being supplied to the water supply pipe, the flow pressure is the detected water pressure, of the plurality of water pressures in the storage unit, once the expected time elapses after the water supply valve is controlled to the open state, the flow pressure being lower than the pump pressure, and the inspection unit is configured to determine that the water supply pipe and the water supply valve are normal when the time constant which is calculated is greater than a predetermined expected time constant, and determine that the water supply pipe and the water supply valve are damaged if the time constant is less than the predetermined expected time constant.

5. A non-transitory computer readable medium storing instructions to, when executed by a processor, cause the processor to cause a water supply valve, which is provided to a water supply pipe provided in a farm field that is open and in which a plant grows, to transit from a state where the water supply valve is in an open state and where irrigation water is supplied from the water supply pipe to the farm field, to a state where the water supply valve is in a closed state and where supply of irrigation water from the water supply pipe to the farm field is stopped, acquire a plurality of water pressures of irrigation water detected by a water pressure sensor in a period from a state where the water supply valve becomes in the open state, until an expected time elapses after the water supply valve becomes in the closed state and the water supply pipe is expected to be filled with irrigation water, calculate a time constant of a water pressure, the time constant being based on a change over time in water pressure during a transition period in which the water pressure recovers from a flow pressure to a pump pressure which is higher than the flow pressure, based on a change in the plurality of water pressures of the irrigation water and inspect the water supply pipe based on the time constant, and determine that the water supply pipe and the water supply valve are normal when the time constant that is calculated is higher than an expected time constant, which is determined based on the time constant when the water pressure with no damage occurring recovers from the flow pressure to the pump pressure.

6. The non-transitory computer readable medium according to claim 5, wherein the instructions, when executed by the processor, cause the processor to calculate the time constant based on the change over time in water pressure during the transition period in which the water pressure recovers from the flow pressure to the pump pressure.

7. The non-transitory computer readable medium according to claim 5, wherein the time constant is a speed of the change over time of the water pressure during the transition period in which the water pressure recovers from the flow pressure to the pump pressure, the pump pressure is a detected water pressure, of the plurality of water pressures, in the water supply pipe in a condition that the water supply valve is in the closed state such that irrigation water is being supplied to the water supply pipe, the flow pressure is the detected water pressure, of the plurality of water pressures, once the expected time elapses after the water supply valve is controlled to the open state, the flow pressure being lower than the pump pressure, and wherein the instructions, when executed by the processor, cause the processor to determine that the water supply pipe and the water supply valve are normal when the time constant which is calculated is greater than a predetermined expected time constant, and determine that the water supply pipe and the water supply valve are damaged if the time constant is less than the predetermined expected time constant.

8. An inspection device configured to inspect a water supply pipe provided in a farm field that is open and in which a plant grows, the inspection device comprising:

a processor configured to output a control signal to control a water supply valve, which is configured to control supply and no supply of irrigation water from the water supply pipe to the farm field, between an open state and a closed state; and a storage device configured to store a plurality of water pressures of irrigation water detected by a water pressure sensor in a period from a state where the water supply valve becomes in the open state and where irrigation water is supplied from the water supply pipe to the farm field until an expected time elapses after the water supply valve becomes in the closed state and the water supply pipe is expected to be filled with irrigation water, wherein the processor is configured to calculate a time constant of a water pressure, the time constant being based on a change over time in water pressure during a transition period in which the water pressure recovers from a flow pressure to a pump pressure which is higher than the flow pressure, based on a change in the plurality of water pressures of the irrigation water and inspect the water supply pipe based on the time constant, and the processor is configured to determine that the water supply pipe and the water supply valve are normal when the time constant that is calculated is higher than an expected time constant, which is determined based on the time constant when the water pressure with no damage occurring recovers from the flow pressure to the pump pressure.

9. The inspection device according to claim 8, wherein the processor is configured to calculate the time constant based on the change over time in water pressure during the transition period in which the water pressure recovers from the flow pressure to the pump pressure.

10. The inspection device according to claim 8, wherein the time constant is a speed of the change over time of the water pressure during the transition period in which the water pressure recovers from the flow pressure to the pump pressure, the pump pressure is a detected water pressure, of the plurality of water pressures, in the water supply pipe in a condition that the water supply valve is in the closed state such that irrigation water is being supplied to the water supply pipe, the flow pressure is the detected water pressure, of the plurality of water pressures, once the expected time elapses after the water supply valve is controlled to the open state, the flow pressure being lower than the pump pressure, and the processor is configured to determine that the water supply pipe and the water supply valve are normal when the time constant which is calculated is greater than a predetermined expected time constant, and determine that the water supply pipe and the water supply valve are damaged if the time constant is less than the predetermined expected time constant.

* * * * *